US012230214B2

(12) United States Patent
Zhao et al.

(10) Patent No.: US 12,230,214 B2
(45) Date of Patent: Feb. 18, 2025

(54) ARRAY SUBSTRATE, DISPLAY PANEL AND DRIVING METHOD OF ARRAY SUBSTRATE

(71) Applicants: Chengdu BOE Optoelectronics Technology Co., Ltd., Chengdu (CN); BOE TECHNOLOGY GROUP CO., LTD., Beijing (CN)

(72) Inventors: Shuang Zhao, Beijing (CN); Chenyu Chen, Beijing (CN); Zhongliu Yang, Beijing (CN); Wenbo Chen, Beijing (CN); Zhuo Xu, Beijing (CN); Jing Yang, Beijing (CN); Hongting Lu, Beijing (CN)

(73) Assignees: Chengdu BOE Optoelectronics Technology Co., Ltd., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 822 days.

(21) Appl. No.: 17/274,665

(22) PCT Filed: May 27, 2020

(86) PCT No.: PCT/CN2020/092573

§ 371 (c)(1),
(2) Date: Mar. 9, 2021

(87) PCT Pub. No.: WO2021/237505

PCT Pub. Date: Dec. 2, 2021

(65) Prior Publication Data

US 2022/0199027 A1 Jun. 23, 2022

(51) Int. Cl.
*G09G 3/3266* (2016.01)
*G09G 3/3275* (2016.01)

(52) U.S. Cl.
CPC ......... *G09G 3/3266* (2013.01); *G09G 3/3275* (2013.01); *G09G 2300/0842* (2013.01);
(Continued)

(58) Field of Classification Search
CPC .......... G09G 3/3233–3258; G09G 2300/0426; G09G 2300/08–0895; G09G 2310/061;
(Continued)

(56) References Cited

U.S. PATENT DOCUMENTS

| | | | |
|---|---|---|---|
| 9,269,428 | B2 | 2/2016 | Ryu |
| 9,626,922 | B2 | 4/2017 | Huang et al. |
| 11,200,845 | B2 | 12/2021 | Meng et al. |

(Continued)

FOREIGN PATENT DOCUMENTS

| | | | |
|---|---|---|---|
| CN | 103390392 | A | 11/2013 |
| CN | 203325406 | U | 12/2013 |

(Continued)

OTHER PUBLICATIONS

Written Opinion in PCT/CN2020/092573 dated Mar. 4, 2021 in English.

(Continued)

*Primary Examiner* — Amr A Awad
*Assistant Examiner* — Aaron Midkiff
(74) *Attorney, Agent, or Firm* — Collard & Roe, P.C.; William Collard

(57) ABSTRACT

An array substrate, a display panel, and a driving method of the array substrate are provided. The array substrate includes: a plurality of pairs of gate lines, each pair including a first gate line and a second gate line, and a pixel array, including pixel units arranged into a plurality of rows and a plurality of columns. A scan signal terminal of a pixel unit of an nth column in an mth row of pixel units is connected to the first gate line in an mth pair of gate lines to receive a first scan signal; m and n are positive integers; a reset signal terminal of the pixel unit of the (n+1)th column in the mth row of pixel units is connected to the first gate line in the mth pair of gate lines to receive the first scan signal serving as a first reset signal.

19 Claims, 16 Drawing Sheets

(52) U.S. Cl.
CPC ............... *G09G 2310/0278* (2013.01); *G09G 2310/061* (2013.01)

(58) Field of Classification Search
CPC .............. G09G 2320/0233; G09G 2300/0819; G09G 2300/0842–0852; G09G 2310/0251; G09G 2310/0248; G09G 2340/16; G09G 3/32–3291; G09G 2310/0278; G09G 3/3266; G09G 3/3275; G09G 2300/0861; H05K 59/131
See application file for complete search history.

(56) References Cited

U.S. PATENT DOCUMENTS

| | | | | |
|---|---|---|---|---|
| 11,393,396 | B2 | 7/2022 | Yang et al. | |
| 2010/0053042 | A1 | 3/2010 | Kajiyam et al. | |
| 2014/0035974 | A1* | 2/2014 | Jinta | G09G 3/3225 345/698 |
| 2015/0364083 | A1* | 12/2015 | Jeon | G09G 3/3233 345/76 |
| 2017/0221423 | A1 | 8/2017 | Xiang et al. | |
| 2018/0137818 | A1* | 5/2018 | Kim | G09G 3/2003 |
| 2018/0240400 | A1* | 8/2018 | Zhou | G09G 3/3233 |
| 2019/0355301 | A1* | 11/2019 | Lee | G09G 3/3275 |
| 2020/0152132 | A1* | 5/2020 | Kim | G09G 3/3266 |
| 2020/0273411 | A1 | 8/2020 | Gao et al. | |
| 2022/0302240 | A1 | 9/2022 | Zhang et al. | |

FOREIGN PATENT DOCUMENTS

| | | | |
|---|---|---|---|
| CN | 104575384 | A | 4/2015 |
| CN | 205507290 | U | 8/2016 |
| CN | 109389937 | A | 2/2019 |
| CN | 109599062 | A | 4/2019 |
| CN | 109637453 | A | 4/2019 |
| CN | 109637456 | A | 4/2019 |
| CN | 110675824 | A | 10/2019 |
| CN | 110599971 | A | 12/2019 |
| CN | 110660360 | A | 1/2020 |
| CN | 110767665 | A | 2/2020 |
| CN | 110969989 | A | 4/2020 |
| CN | 210627878 | U | 5/2020 |
| JP | 2010060648 | A | 3/2010 |

OTHER PUBLICATIONS

International Search Report in PCT/CN2020/092573 in Chinese dated Mar. 4, 2021 with English translation.
Written Opinion in PCT/CN2020/092573 in Chinese dated Mar. 4, 2021.
Extended European Search Report in European Application No. 20900718.6 dated Jul. 22, 2022.
Japanese Office Action in Japanese Application No. 2021-569201 dated Feb. 27, 2024 with English translation.

* cited by examiner

ARRAY SUBSTRATE, DISPLAY PANEL AND DRIVING METHOD OF ARRAY SUBSTRATE

CROSS REFERENCE TO RELATED APPLICATIONS

This application is the National Stage of PCT/CN2020/092573 filed on May 27, 2020, the disclosure of which is incorporated by reference.

TECHNICAL FIELD

Embodiments of the present disclosure relate to an array substrate, a display panel, and a driving method of the array substrate.

BACKGROUND

With the development of display technology, various display panels have been widely used. The display panels mainly include a Liquid Crystal Display (LCD) panel and an Organic Light-Emitting Diode (OLED) display panel. For example, a plurality of pixel units arranged as an array are provided in the OLED display panel. The pixel units in a same row are connected to a same gate line, and the pixel units in a same column are connected to a same data line. Each pixel unit performs display under the drive of a scan signal provided by the gate line and a data signal provided by the data line.

SUMMARY

According to at least on embodiment of the disclosure, an array substrate is provided. The array substrate comprises: a plurality of pairs of gate lines, each pair of gate lines comprising a first gate line and a second gate line; a plurality of data lines; and a pixel array, comprising a plurality of pixel units arranged into a plurality of rows and a plurality of columns. Each of the plurality of pixel units comprises a scan signal terminal, a data signal terminal and a reset signal terminal, the plurality of rows of pixel units are in one-to-one correspondence with the plurality of pairs of gate lines, and the pixel units of each column corresponds to one data line of the plurality of data lines; the scan signal terminal of a pixel unit of an nth column in an mth row of pixel units is connected to the first gate line in an mth pair of gate lines to receive a first scan signal; m and n are positive integers; the scan signal terminal of a pixel unit of an (n+1)th column in the mth row of pixel units is connected to the second gate line in the mth pair of gate lines to receive a second scan signal; the reset signal terminal of the pixel unit of the (n+1)th column in the mth row of pixel units is connected to the first gate line in the mth pair of gate lines to receive the first scan signal serving as a first reset signal; data signal terminals of the pixel units of each column are connected to a corresponding data line to receive a data signal.

For example, the reset signal terminal of the pixel unit of the nth column in the mth row of pixel units is connected to the first gate line of an (m−1)th pair of gate lines to receive the first scan signal, and the first scan signal is provided by the first gate line of the (m−1)th pair of gate lines and used as a second reset signal, or the reset signal terminal of the pixel unit of the nth column in the mth row of pixel units is connected to the second gate line of the (m−1)th pair of gate lines to receive the second scan signal, and the second scan signal is provided by the second gate line of the (m−1)th pair of gate lines and used as the second reset signal, m is an integer greater than 1.

For example, the array substrate further comprises a plurality of reset signal lines; the plurality of reset signal lines are in one-to-one correspondence with the plurality of rows of pixel units; the reset signal terminal of the pixel unit of the nth column in the mth row of pixel units is connected to an mth reset signal line to receive a second reset signal.

For example, the array substrate further comprises a first scan driving circuit; the first scan driving circuit is connected to the plurality of reset signal lines, and is configured to generate the second reset signal.

For example, the array substrate further comprises a plurality of light-emitting control signal lines; the plurality of light-emitting control signal lines are in one-to-one correspondence with the plurality of rows of pixel units; each of the plurality of pixel units further comprises a light-emission control signal terminal, and light-emission control signal terminals of pixel units in the mth row of pixel units are connected to an mth light-emission control signal line to receive a light-emission control signal.

For example, the array substrate further comprises a second scan driving circuit; the second scan driving circuit is connected to the plurality of light-emitting control signal lines and is configured to generate the light-emitting control signal.

For example, every two adjacent columns of pixel units correspond to a same data line, data signal terminals of pixel units of the nth column and data signal terminals of pixel units of the (n+1)th column are connected to a same data line.

For example, the array substrate further comprises a third scan driving circuit; the third scan driving circuit is connected to the plurality of pairs of gate lines, and is configured to generate the first scan signal and the second scan signal.

For example, the third scan driving circuit comprises a first scan driving sub-circuit and a second scan driving sub-circuit; the first scan driving sub-circuit is connected to the first gate line in each pair of gate lines and is configured to generate the first scan signal; the second scan driving sub-circuit is connected to the second gate line of each pair of gate lines and is configured to generate the second scan signal.

For example, the first scan driving sub-circuit and the second scan driving sub-circuit are respectively disposed on two opposite sides of the pixel array.

For example, each of the plurality of pixel units comprises a pixel circuit, and the pixel circuit comprises: a reset circuit, a data writing and compensation circuit, a driving circuit, and a light-emitting control circuit; the reset circuit comprises the reset signal terminal and is connected to a reset voltage source, the driving circuit, and a light emitting element, and the reset circuit is configured to apply a reset voltage to the driving circuit and the light emitting element to reset the driving circuit and the light emitting element; the data writing and compensation circuit comprises the scan signal terminal and the data signal terminal and is connected to the driving circuit, and the data writing and compensation circuit is configured to write the data signal into the driving circuit and compensate for the driving circuit; the driving circuit is configured to generate a driving current for driving the light emitting element to emit light; the light-emitting control circuit comprises the light-emitting control signal terminal and is connected to a first voltage source, the driving circuit, and the light emitting element, and the light-emitting control circuit is configured to apply a first voltage to the driving circuit and apply the driving current generated by the driving circuit to the light emitting element.

For example, the reset circuit comprises a first reset transistor and a second reset transistor; the data writing and compensation circuit comprises a data writing transistor, a compensation transistor, and a storage capacitor; the driving circuit comprises a driving transistor; the light-emitting control circuit comprises a first light-emitting control transistor and a second light-emitting control transistor; a gate electrode of the first reset transistor is connected to the reset signal terminal, a first electrode of the first reset transistor is connected to the reset voltage source, and a second electrode of the first reset transistor is connected to a gate electrode of the driving transistor; a gate electrode of the second reset transistor is connected to the reset signal terminal, a first electrode of the second reset transistor is connected to the reset voltage source, and a second electrode of the second reset transistor is connected to a first terminal of the light emitting element; a gate electrode of the data writing transistor is connected to the scan signal terminal, a first electrode of the data writing transistor is connected to the data signal terminal, and a second electrode of the data writing transistor is connected to a first electrode of the driving transistor; a gate electrode of the compensation transistor is connected to the scan signal terminal, a first electrode of the compensation transistor is connected to a second electrode of the driving transistor, and a second electrode of the compensation transistor is connected to the gate electrode of the driving transistor; a first terminal of the storage capacitor is connected to the first voltage source, and a second terminal of the storage capacitor is connected to the gate electrode of the driving transistor; a gate electrode of the first light-emitting control transistor is connected to the light-emitting control signal terminal, a first electrode of the first light-emitting control transistor is connected to the first voltage source, and a second electrode of the first light-emitting control transistor is connected to the first electrode of the driving transistor; a gate electrode of the second light-emitting control transistor is connected to the light-emitting control signal terminal, a first electrode of the second light-emitting control transistor is connected to the second electrode of the driving transistor, and a second electrode of the second light-emitting control transistor is connected to the first terminal of the light emitting element.

According to at least one embodiment, a display panel is provided. The display panel comprises the array substrate as described above.

According to at least one embodiment, a driving method of the array substrate is provided. The driving method comprises: resetting the pixel unit of the nth column in the mth row of pixel units; performing data writing and compensation on the pixel unit of the nth column in the mth row of pixel units, and simultaneously resetting the pixel unit of the (n+1)th column in the mth row of pixel units; performing data writing and compensation on the pixel unit of the (n+1)th column in the mth row of pixel units; performing display by the pixel unit of the nth column and the pixel unit of the (n+1)th column in the mth row of pixel units.

For example, the performing data writing and compensation on the pixel unit of the nth column in the mth row of pixel units and simultaneously resetting the pixel unit of the (n+1)th column in the mth row of pixel units comprising: providing the first scan signal for the pixel unit of the nth column in the mth row of pixel units through the first gate line in the mth pair of gate lines, and providing the data signal for the pixel unit of the nth column in the mth row of pixel units through one data line corresponding to the pixel units of the nth column, so as to perform data writing and compensation on the pixel unit of the nth column in the mth row of pixel units; and simultaneously providing the first scan signal for the pixel unit of the (n+1)th column in the mth row of pixel units through the first gate line in the mth pair of gate lines, the first scan signal being used as the first reset signal to reset the pixel unit of the (n+1)th column in the mth row of pixel units.

For example, the resetting the pixel unit of the nth column in the mth row of pixel units comprises: providing the first scan signal for the pixel unit of the nth column in the mth row of pixel units through the first gate line in the (m−1)th pair of gate lines, the first scan signal being used as a second reset signal to reset the pixel unit of the nth column in the mth row of pixel units; or providing the second scan signal for the pixel unit of the nth column in the mth row of pixel units through the second gate line in the (m−1)th pair of gate lines, the second scan signal being used as the second reset signal to reset the pixel unit of the nth column in the mth row of pixel units.

For example, the array substrate further comprises a plurality of light-emitting reset signal lines; the resetting the pixel unit of the nth column in the mth row of pixel units comprises: providing a second reset signal for the pixel unit of the nth column in the mth row of pixel units to reset the pixel unit of the nth column in the mth row of pixel units.

For example, the performing data writing and compensation on the pixel unit of the (n+1)th column in the mth row of pixel units comprises: providing the second scan signal for the pixel unit of the (n+1)th column in the mth row of pixel units through the second gate line in the mth pair of gate lines, and providing the data signal for the pixel unit of the (n+1)th column in the mth row of pixel units through one data line corresponding to the pixel units of the (n+1)th column, so as to perform data writing and compensation on the pixel unit of the n+1)th column in the mth row of pixel units.

For example, the array substrate further comprises a plurality of light-emitting control signal lines; the performing display by the pixel unit of the nth column and the pixel unit of the (n+1)th column in the mth row of pixel units display comprises: providing a light-emitting control signal for the pixel units of the nth column and the (n+1)th column in the mth row of pixel units through an mth light-emitting control signal line, so as to perform display by the pixel units of the nth and (n+1)th columns in the mth row of pixel units.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

Unless otherwise defined, the technical terms or scientific terms here should be of general meaning as understood by those ordinarily skilled in the art. In the descriptions and claims of the present disclosure, expressions such as "first", "second" and the like do not denote any order, quantity, or importance, but rather are used for distinguishing different components. Similarly, expressions such as "include" or "comprise" and the like denote that elements or objects appearing before the words of "include" or "comprise" cover the elements or the objects enumerated after the words of "include" or "comprise" or equivalents thereof, not exclusive of other elements or objects. Expressions such as "connect" or "interconnect" and the like are not limited to physical or mechanical connections, but may include electrical connections, whether direct or indirect. Expressions such as "up", "down", "left", "right" and the like are only used for expressing relative positional relationship, the relative positional relationship may be correspondingly changed in the case that the absolute position of a described object is changed.

Figure 1:
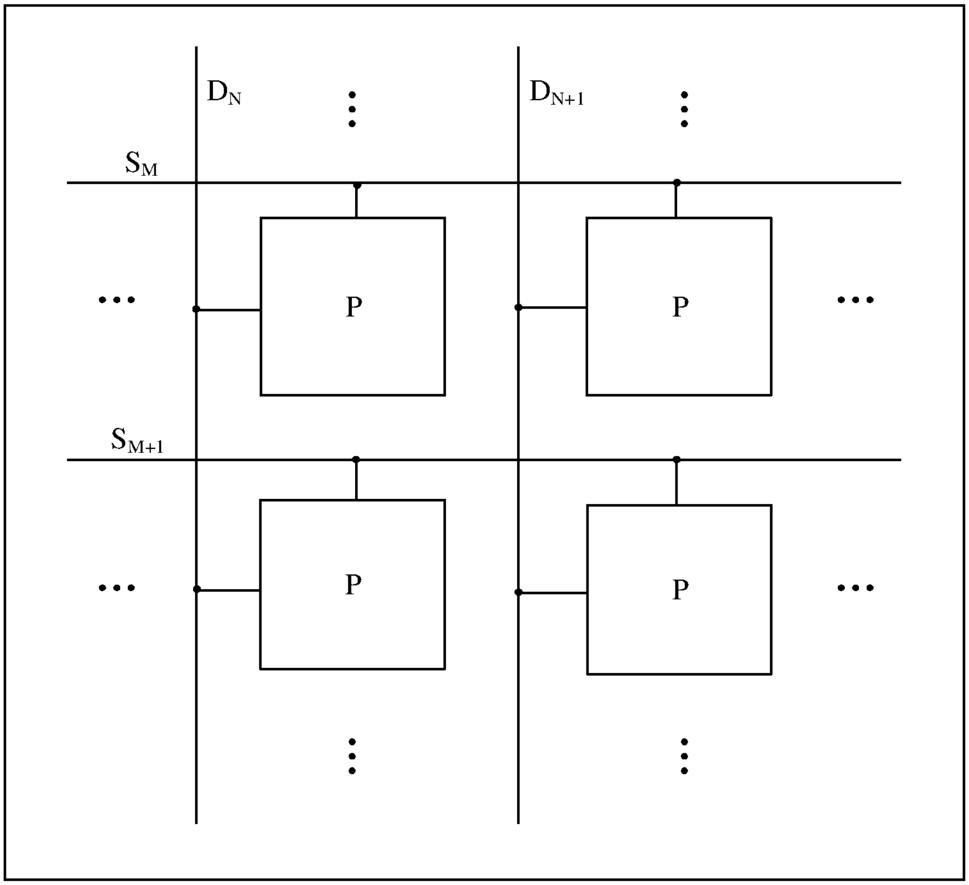
FIG. 1 is a schematically structural diagram of an array substrate.

FIG. 1 is a schematically structural diagram of an array substrate. As shown in FIG. 1, the array substrate includes: a base substrate; and a plurality of gate lines S, a plurality of data lines D as well as a pixel array arranged on the base substrate. The pixel array includes a plurality of pixel units P, which are arranged into a plurality of rows and a plurality of columns. Pixel units in an mth row are connected to an mth gate line SM to receive a scan signal, and pixel units in an nth column are connected to an nth data line DN to receive a data signal. Under the control of the received scan signal, each pixel unit of the pixel array operates based on the received data signal to emit required grayscale light, so as to realize an image display.

In the array substrate shown in FIG. 1, because the pixel units of the plurality of columns in a same row are connected to a same gate line, the pixel units of the plurality of columns in a same row are switched on simultaneously under the drive of the scan signal provided by the same gate line, and the switch-on time for the pixel units of the plurality of columns in the same row is consistent. Moreover, because the pixel units of the plurality of columns in the same row are respectively connected to the plural different data lines, the pixel units of the plurality of columns in the same row successively write data signals which are respectively provided by the plural different data lines. In this case, the pixel units of the plurality of columns in the same row may have different charging manner, such as charging before discharging, or charging while discharging, which will further lead to uneven display brightness of the pixel units of the plurality of columns in the same row and affect display quality.

At least one embodiment of the present disclosure provides an array substrate, which includes: a plurality of pairs of gate lines, each pair of gate lines comprising a first gate line and a second gate line; a plurality of data lines; and a pixel array, comprising a plurality of pixel units arranged into a plurality of rows and a plurality of columns. Each of the plurality of pixel units comprises a scan signal terminal, a data signal terminal and a reset signal terminal, the plurality of rows of pixel units are in one-to-one correspondence with the plurality of pairs of gate lines, and pixel units of each column corresponds to one of the plurality of data lines. A scan signal terminal of a pixel unit of an nth column in an mth row of pixel units is connected to the first gate line in an mth pair of gate lines to receive a first scan signal; m and n are positive integers. A scan signal terminal of a pixel unit of an (n+1)th column in the mth row of pixel units is connected to the second gate line in the mth pair of gate lines to receive a second scan signal. A reset signal terminal of the pixel unit of the (n+1)th column in the mth row of pixel units is connected to the first gate line in the mth pair of gate lines to receive the first scan signal serving as a first reset signal. Data signal terminals of the pixel units of the each column are connected to a corresponding data line to receive a data signal.

In the array substrate provided by the embodiment of the present disclosure, the scan signal terminal of the pixel unit of the nth column in the mth row of pixel units is connected to the first gate line in the mth pair of gate lines to receive the first scan signal, and the scan signal terminal of the pixel unit of the (n+1)th column in the mth row of pixel units is connected to the second gate line in the mth pair of gate lines to receive the second scan signal. In this way, the pixel unit of the nth column in the mth row of pixel units is first switched on under the drive of the first scan signal that is provided by the first gate line in the mth pair of gate lines, and then, the pixel unit of the (n+1)th column in the mth row of pixel units is switched on under the drive of the second scan signal that is provided by the second gate line in the mth pair of gate lines; moreover, the switch-on period for the pixel unit of the nth column in the mth row and the switch-on period for the pixel unit of the (n+1)th column in the mth row are same in time length. In this case, among the mth row of pixel units, the pixel units in the nth and (n+1) columns have same charging manner, which avoids the problem of uneven display brightness of the pixel units of the plurality of columns in the same row, thereby increasing the display quality.

Moreover, in the array substrate provided by the embodiment of the present disclosure, the scan signal terminal of the pixel unit of the nth column in the mth row of pixel units is connected to the first gate line in the mth pair of gate lines, and the reset signal terminal of the pixel unit of the (n+1)th column in the mth row of pixel units is also connected to the first gate line in the mth pair of gate lines. In this way, the first scan signal, which is provided by the first gate line in the mth pair of gate lines for the pixel unit of the nth column in the mth row of pixel units, serves as the first reset signal and is applied to the pixel unit of the (n+1)th column in the mth row of pixel units, so as to reset the pixel unit of the (n+1)th column in the mth row of pixel units. In this case, the total number of gate drivers integrated on the array substrate (i.e., Gate-driver On Array, GOA) can be further reduced, which is beneficial for the display device adopting the array substrate to achieve a narrow frame design.

A non-restrictive description of the array substrate provided by the embodiments of the present disclosure is given below in combination with the drawings. As described below, without conflict with each other, the different features in these specific embodiments may be combined with each other to obtain new embodiments, and these new embodiments also belong to the protective scope of the present disclosure.

Figure 2A:
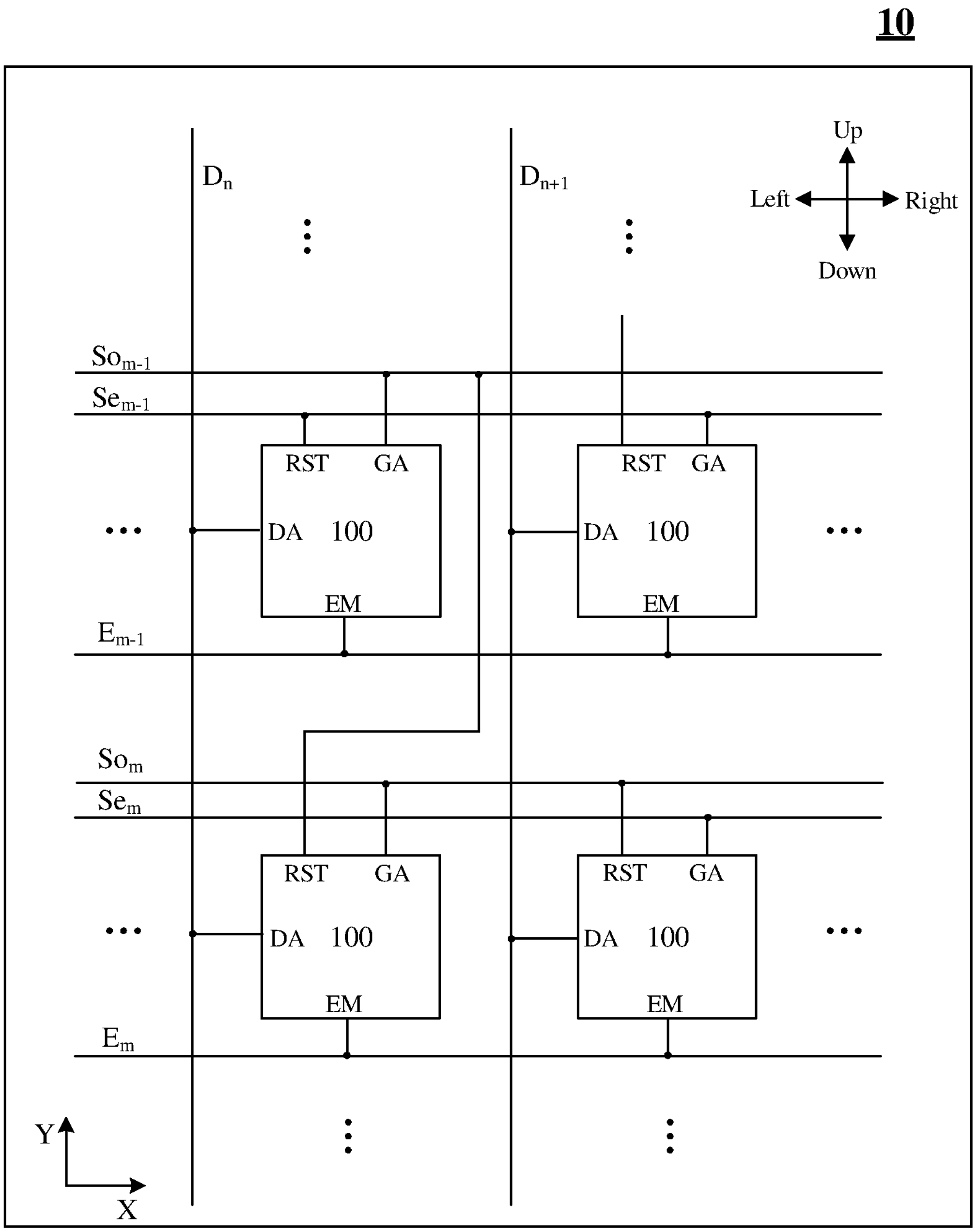
FIG. 2A is a schematically structural diagram of an array substrate provided by embodiments of the present disclosure.
Figure 2B:
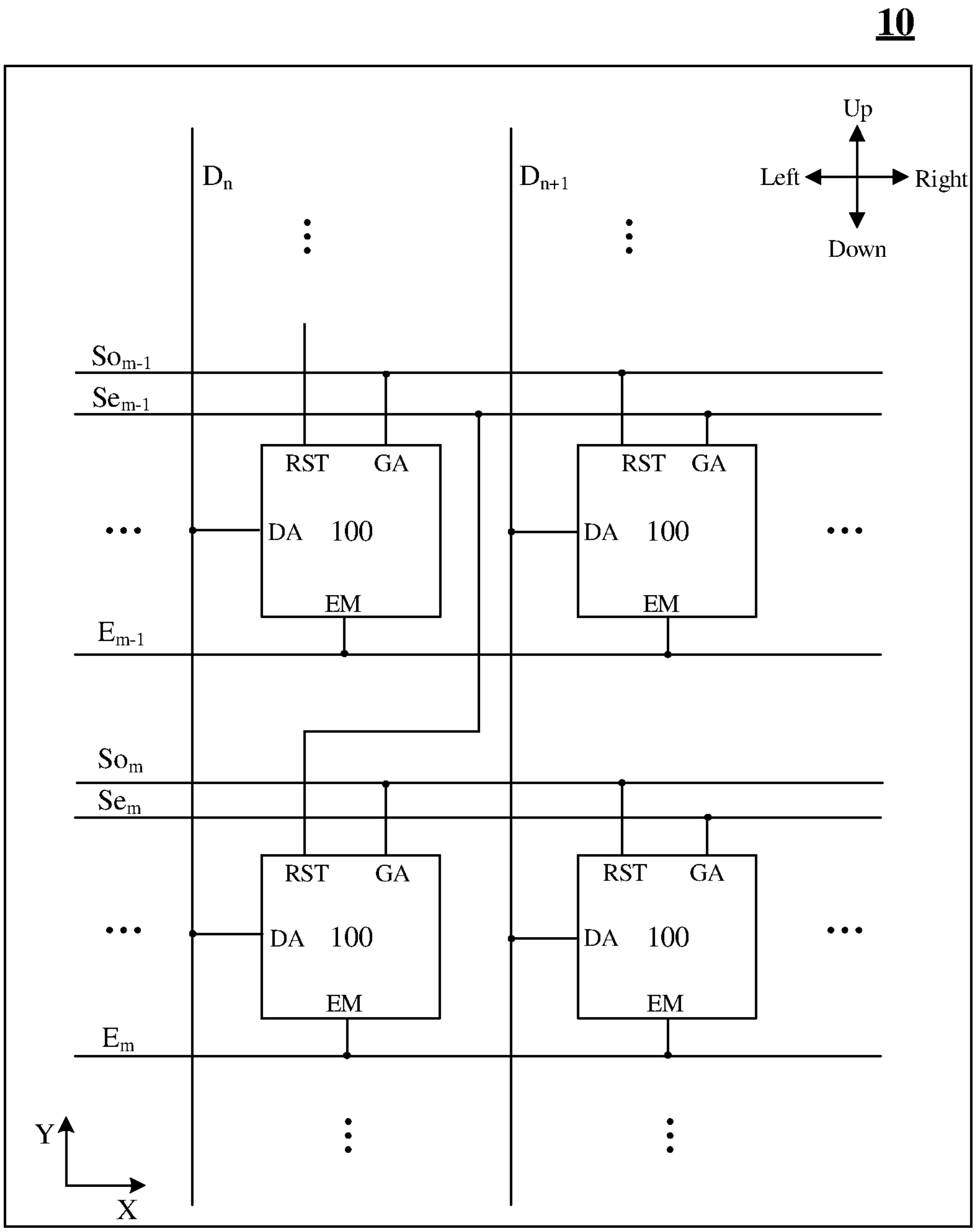
FIG. 2B is another schematically structural diagram of the array substrate provided by the embodiments of the present disclosure.

FIG. 2A is a schematically structural diagram of the array substrate provided by the embodiments of the present disclosure. FIG. 2B is another schematically structural diagram of the array substrate provided by the embodiments of the present disclosure.

As shown in FIG. 2A and FIGS. 2B, the array substrate 10 includes a base substrate, a plurality of pairs of gate lines S, a plurality of data lines D and a pixel array; the plurality of pairs of gate lines S, the plurality of data lines D and the pixel array are arranged on the base substrate. The base substrate may be glass substrate, plastic substrate, etc., which is not limited in the embodiments of the present disclosure. The plurality of pairs of gate lines S are arranged on the base substrate along a first direction. Each of the plurality of pairs of gate lines S includes a first gate line So and a second gate line Se. The plurality of data lines D are arranged on the base substrate along a second direction. The pixel array includes a plurality of pixel units 100 arranged into a plurality of rows and a plurality of columns. For example, the plurality of pixel units 100 are respectively located in pixel regions defined by intersections of the plurality of pairs of gate lines S and the plurality of data lines D. Each pixel unit 100 includes a scan signal terminal GA, a data signal terminal DA, and a reset signal terminal RST to respectively receive a scan signal (for example, a first scan signal or a second scan signal), a data signal, and a reset signal (for example, a first reset signal or a second reset signal) for the pixel unit 100.

For example, the first direction is perpendicular to the second direction, and the first direction is a row direction of the pixel array (for example, the X direction shown in FIGS. 2A and 2B). The second direction is a column direction of the pixel array (for example, the Y direction shown in FIGS. 2A and 2B).

As shown in FIGS. 2A and 2B, the plurality of rows of the pixel units are in one-to-one correspondence with the plurality of pairs of the gate lines S. The pixel units of each row are connected to a corresponding pair of gate lines S. For example, the mth row of pixel units corresponds to the mth pair of gate lines $S_m$, the pixel unit of the nth column in the mth row of pixel units corresponds to a first gate line $Se_m$ in the mth pair of gate lines $S_m$, and the pixel unit of the (n+1)th column in the mth row of pixel units corresponds to a second gate line $So_m$ in the mth pair of gate lines $S_m$. The scan signal terminal GA of the pixel unit of the nth column in the mth row of pixel units is connected to the first gate line $Se_m$ in the mth pair of gate lines $S_m$ to receive a first scan signal. The scan signal terminal GA of the pixel unit of the (n+1)th column in the mth row of pixel units is connected to the second gate line $So_m$ in the mth pair of gate lines to receive a second scan signal; m and n are positive integers.

It should be noted that, although it is shown in FIGS. 2A and 2B that the first gate line $Se_m$ and the second gate line $So_m$ in the mth pair of gate lines $S_m$ are arranged on the same side of the mth row of pixel units, the embodiments of the present disclosure are not limited thereto. For example, the first gate line $Se_m$ and the second gate line $So_m$ in the mth pair of gate lines $S_m$ may be disposed on two opposite sides of the mth row of pixel units. For example, the first gate line $Se_m$ in the mth pair of gate lines $S_m$ is arranged on an upper side of the mth row of pixel units, while the second gate line $So_m$ in the mth pair of gate lines $S_m$ is arranged on a lower side of the mth row of pixel units.

As shown in FIGS. 2A and 2B, the plurality of columns of the pixel units are in one-to-one correspondence with the plurality of data lines D. Pixel units of each column are connected to one corresponding data line D. For example, pixel units of the nth column corresponds to the nth data line $D_n$, the data signal terminals DA of the pixel units of the nth column are connected to the nth data line $D_n$ to receive the data signal.

It should be noted that, although it is shown in FIGS. 2A and 2B that the plurality of columns of the pixel units are in one-to-one correspondence with the plurality of data lines D, the embodiments of the present disclosure are not limited thereto. For example, pixel units of each column correspond to one data line D of the plurality of data lines D, and the pixel units of every two adjacent columns correspond to the same data line D. For example, the pixel units of the nth column and the pixel units of the (n+1)th column correspond to the same data line; the pixel unit of the (n+2)th column (not shown) and the pixel unit of the (n+3)th column (not shown) correspond to the same data line, . . . , and so on. The data signal terminals DA of the pixel units of the nth column and the data signal terminals DA of the pixel units of the (n+1)th column are connected to the same data line to receive the data signal. The data signal terminals DA of the pixel units of the (n+2)th column and the data signal terminals DA of the pixel units of the (n+3)th column are connected to the same data line to receive the data signal, . . . , and so on.

It should be noted that, although it is shown in FIGS. 2A and 2B that the nth data line $D_n$ is arranged on the left side of the nth column of pixel units and one column of pixel units is arranged between two data lines D, the embodiments of the present disclosure are not limited thereto. For example, the nth data line $D_n$ is arranged on the right side of the nth column of pixel units. Moreover, in a situation where two adjacent columns of pixel units correspond to the same data line D, the same data line D is arranged between the two adjacent columns of pixel units which correspond to the same data line D, that is, pixel units of two columns are arranged between two data lines D.

As shown in FIGS. 2A and 2B, the reset signal terminal RST of the pixel unit of the (n+1)th column in the mth row of pixel units is connected to the first gate line $So_m$ in the mth pair of gate lines $S_m$ to receive the first scan signal. In this case, the first scan signal, which is provided by the first gate line $So_m$ in the mth pair of gate lines $S_m$ for the pixel unit of the nth column in the mth row of pixel units, serves as a first reset signal and is applied to the pixel unit of the (n+1)th column in the mth row of pixel units, so as to reset the pixel unit of the (n+1)th column in the mth row of pixel units.

In the array substrate provided by the embodiments of the present disclosure, the reset signal terminal of the pixel unit of the nth column in the mth row of pixel units is connected to the first gate line of the (m−1)th pair of gate lines to receive the first scan signal provided by the first gate line of the (m−1)th pair of gate lines and serving as a second reset signal, so as to reset the pixel unit of the nth column in the mth row of pixel units. In this case, m is an integer greater than 1.

As shown in FIG. 2A, the reset signal terminal RST of the pixel unit of the nth column in the mth row of pixel units is connected to the first gate line $So_{m-1}$ of the (m−1)th pair of gate lines $S_{m-1}$. In this case, the first scan signal, which is provided by the first gate line $So_{m-1}$ of the (m−1)th pair of gate lines $S_{m31\ 1}$ for the pixel unit of the nth column in the (m−1)th row of pixel units, serves as the second reset signal and is applied to the pixel unit of the nth column in the mth row of pixel units, so as to reset the pixel unit of the nth column in the mth row of pixel units.

Moreover, as shown in FIG. 2A, in a situation where the reset signal terminal RST of the pixel unit of the nth column in the mth row of pixel units is connected to the first gate line $So_{m-1}$ of the (m−1)th pair of gate lines $S_{m-1}$, the reset signal terminal RST of the pixel unit of the nth column in the (m−1)th row of pixel units is connected to the second gate line $Se_{m-1}$ of the (m−1)th pair of gate lines $S_{m-1}$. In this case, the second scan signal, which is provided by the second gate line $Se_{m-1}$ of the (m−1)th pair of gate lines $S_{m-1}$ for the pixel unit of the (n+1)th column in the (m−1)th row of pixel units, serves as the second reset signal and is applied to the pixel unit of the nth column in the (m−1)th row of pixel units, so as to reset the pixel unit of the nth column in the (m−1)th row of pixel units.

With reference to FIG. 2A, in a situation where the reset signal terminal RST of the pixel unit of the nth column in the mth row of pixel units is connected to the first gate line $S\mathbf{0}_{m-1}$ of the (m−1)th pair of gate lines $S_{m-1}$, the reset signal terminal RST of the pixel unit of the nth column in the (m−1)th row of pixel units is connected to the second gate line $Se_{m-1}$ of the (m−1)th pair of gate lines $S_{m-1}$, and the reset signal terminal RST of the pixel unit of the (n+1)th column in the mth row of pixel units is connected to the first gate line $So_m$ of the mth pair of gate lines $S_m$. In this case, the manner in which the pixel units of the nth and (n+1)th columns in the (m−1)th row of pixel units are reset is different from the manner in which the pixel units of the nth and (n+1)th columns in the mth row of pixel units are reset. For example, with respect to the working cycles of the pixel units respectively in the (m−1)th and mth rows, among the (m−1)th row of pixel units, the pixel unit of the nth column is reset by the second scan signal, which is provided for the pixel unit of the (n+1)th column and serves as the second reset signal; among the mth row of pixel units, the pixel unit of the (n+1)th column is reset by the first scan signal, which is provided for the pixel unit of the nth column and serves as the first reset signal.

In the array substrates provided by other embodiments of the present disclosure, the reset signal terminal of the pixel unit of the nth column in the mth row of pixel units is connected to the second gate line of the (m−1)th pair of gate lines, so as to receive the second scan signal provided by the second gate line of the (m−1)th pair of gate lines and serving as the second reset signal, and to reset the pixel unit of the nth column in the mth row of pixel units. In this case, m is an integer greater than 1.

As shown in FIG. 2B, the reset signal terminal RST of the pixel unit of the nth column in the mth row of pixel units is connected to the second gate line $Se_{m-1}$ of the (m−1)th pair of gate lines $S_{m-1}$. In this case, the second scan signal, which is provided by the second gate line $Se_{m-1}$ of the (m−1)th pair of gate lines $S_{2-1}$ for the pixel unit of the (n+1)th column in the (m−1)th row of pixel units, serves as the second reset signal and is applied to the pixel unit of the nth column in the mth row of pixel units, so as to reset the pixel unit of the nth column in the mth row of pixel units.

Moreover, as shown in FIG. 2B, in a situation where the reset signal terminal RST of the pixel unit of the nth column in the mth row of pixel units is connected to the second gate line $Se_{m-1}$ of the (m−1)th pair of gate lines $S_{m-1}$, the reset signal terminal RST of the pixel unit of the (n+1)th column in the (m−1)th row of pixel units is connected to the first gate line $So_{m-1}$ of the (m−1)th pair of gate lines $S_{m-1}$. In this case, the first scan signal, which is provided by the first gate line $So_{m-1}$ of the (m−1)th pair of gate lines $S_{m-1}$ for the pixel unit of the nth column in the (m−1)th row of pixel units, serves as the first reset signal and is applied to the pixel unit of the (n+1)th column in the (m−1)th row of pixel units, so as to reset the pixel unit of the (n+1)th column in the (m−1)th row of pixel units.

With reference to FIG. 2B, in a situation where the reset signal terminal RST of the pixel unit of the nth column in the mth row of pixel units is connected to the second gate line $Se_{m-1}$ of the (m−1)th pair of gate lines $S_{m-1}$, the reset signal terminal RST of the pixel unit of the (n+1)th column in the (m−1)th row of pixel units is connected to the first gate line $So_{2-1}$ of the (m−1)th pair of gate lines $S_{m-1}$, and the reset signal terminal RST of the pixel unit of the (n+1)th column in the mth row of pixel units is connected to the first gate line $So_m$ of the mth pair of gate lines $S_m$. In this case, the manner in which the pixel units of the nth and (n+1)th columns in the (m−1)th row of pixel units are reset is different from the manner in which the pixel units of the nth and (n+1)th columns in the mth row of pixel units are reset. For example, with respect to the working cycles of the pixel units respectively in the (m−1)th row and the mth rows, the pixel units of the (n+1) column in both the (m−1)th and mth rows of pixel units are reset by the first scan signal, which is provided for the pixel unit of the nth column and serves as the first reset signal.

It should be noted that, the first reset signal and the second reset signal in the present disclosure are for pixel units of different columns (for example, the nth column and the (n+1)th column) in the same row of pixel units, and are configured for distinguishing from each other when they are described, so they don't represent the time order or other limitations. For example, the first reset signal may refer to a signal for resetting the pixel units of the (n+1)th column, and the second reset signal may refer to a signal for resetting the pixel units of the nth column. For example, in this case and as shown in FIG. 2A, among the mth row of pixel units, the pixel unit of the nth column receives the first scan signal from the first gate line $So_{m-1}$ of the (m−1)th pair of gate lines $S_{m-1}$ and uses the first scan signal as the second reset signal, and the pixel unit of the (n+1)th column receives the first scan signal from the first gate line $So_m$ of the mth pair of gate lines $S_m$ and uses the first scan signal as the first reset signal. Among the (m−1)th row of pixel units, the pixel unit of the nth column receives the second scan signal from the second gate line $Se_{m-1}$ of the (m−1)th pair of gate lines $S_m$_and uses the second scan signal as the second reset signal. As shown in FIG. 2B, among the mth row of pixel units, the pixel unit of the nth column receives the second scan signal from the second gate line $Se_{m-1}$ of the (m−1)th pair of gate lines $S_{m-1}$ and uses the second scan signal as the second reset signal, and the pixel unit of the (n+1)th column receives the first scan signal from the first gate line $So_m$ of the mth pair of gate lines $S_m$ and uses the first scan signal as the first reset signal. Among the (m−1)th row of pixel units, the pixel unit of the (n+1)th column receives the first scan signal from the first gate line $So_{m-1}$ of the (m−1)th pair of gate lines $S_{m-1}$ and uses the first scan signal as the first reset signal. In the array substrate provided by at least one embodiment of the present disclosure, each pixel unit of the plurality of pixel units further includes a light-emitting control signal terminal to receive a light-emitting control signal for the pixel unit. Accordingly, the array substrate provided in the embodiments further includes a plurality of light-emitting control signal lines arranged on the base substrate, and the plurality of light-emitting control signal lines are in one-to-one correspondence with the plurality of rows of pixel units. Light-emitting control signal terminals of the pixel units in the mth row of pixel units are connected to an mth light-emitting control signal line to receive a light-emitting control signal.

As shown in FIGS. 2A and 2B, each pixel unit 100 further includes a light-emitting control signal terminal EM. The array substrate 10 further includes a plurality of light-emitting control signal lines E arranged on the base substrate. For example, the plurality of light-emitting control signal lines E are arranged on the base substrate along the first direction. The plurality of light-emitting control signal lines E are in one-to-one correspondence with the plurality of rows of pixel units, and pixel units of each row are connected to corresponding one of the light-emitting control signal lines E. For example, the mth row of pixel units corresponds to an mth light-emitting control signal line $E_m$, and light-emitting control signal terminals EM of pixel units in the mth row of pixel units are connected to the mth light-emitting control signal line $E_m$ to receive a light-emitting control signal.

It should be noted that, although it is shown in FIGS. 2A and 2B that the mth light-emitting control signal line $E_m$ is disposed on the lower side of the mth row of pixel units, the embodiments of the present disclosure are not limited thereto. For example, the mth light-emitting control signal line $E_m$ may be arranged on the upper side of the mth row of pixel units.

In some embodiments of the present disclosure, the array substrate may further include a plurality of reset signal lines arranged on the base substrate, and the plurality of reset signal lines are in one-to-one correspondence with a plurality of rows of pixel units. A reset signal terminal of a pixel unit of an nth column in the mth row of pixel units is connected to an mth reset signal line to receive a second reset signal, so as to reset the pixel unit of the nth column in the mth row of pixel units.

Figure 3A:
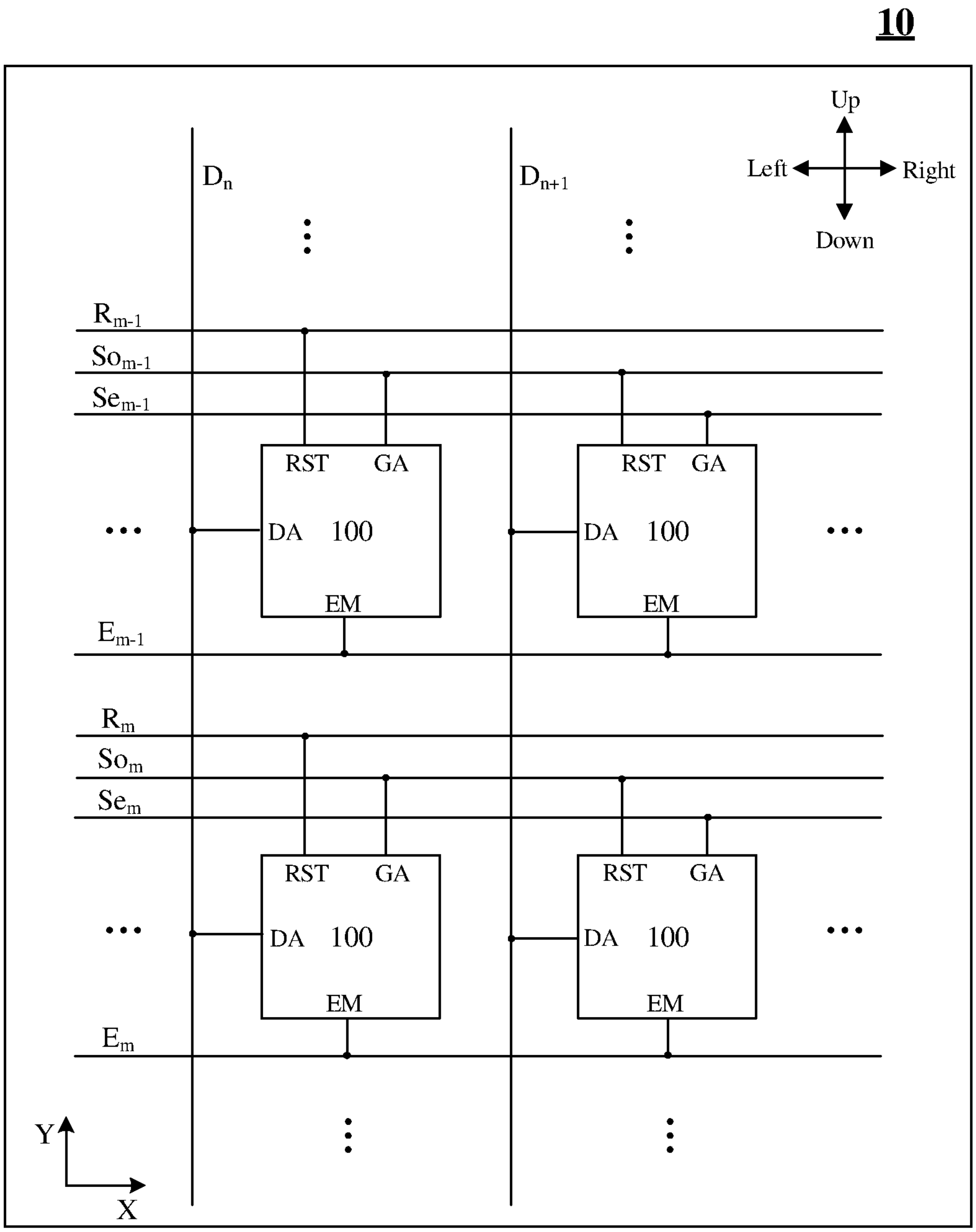
FIG. 3A is yet another schematically structural diagram of the array substrate provided by the embodiments of the present disclosure.
Figure 3B:
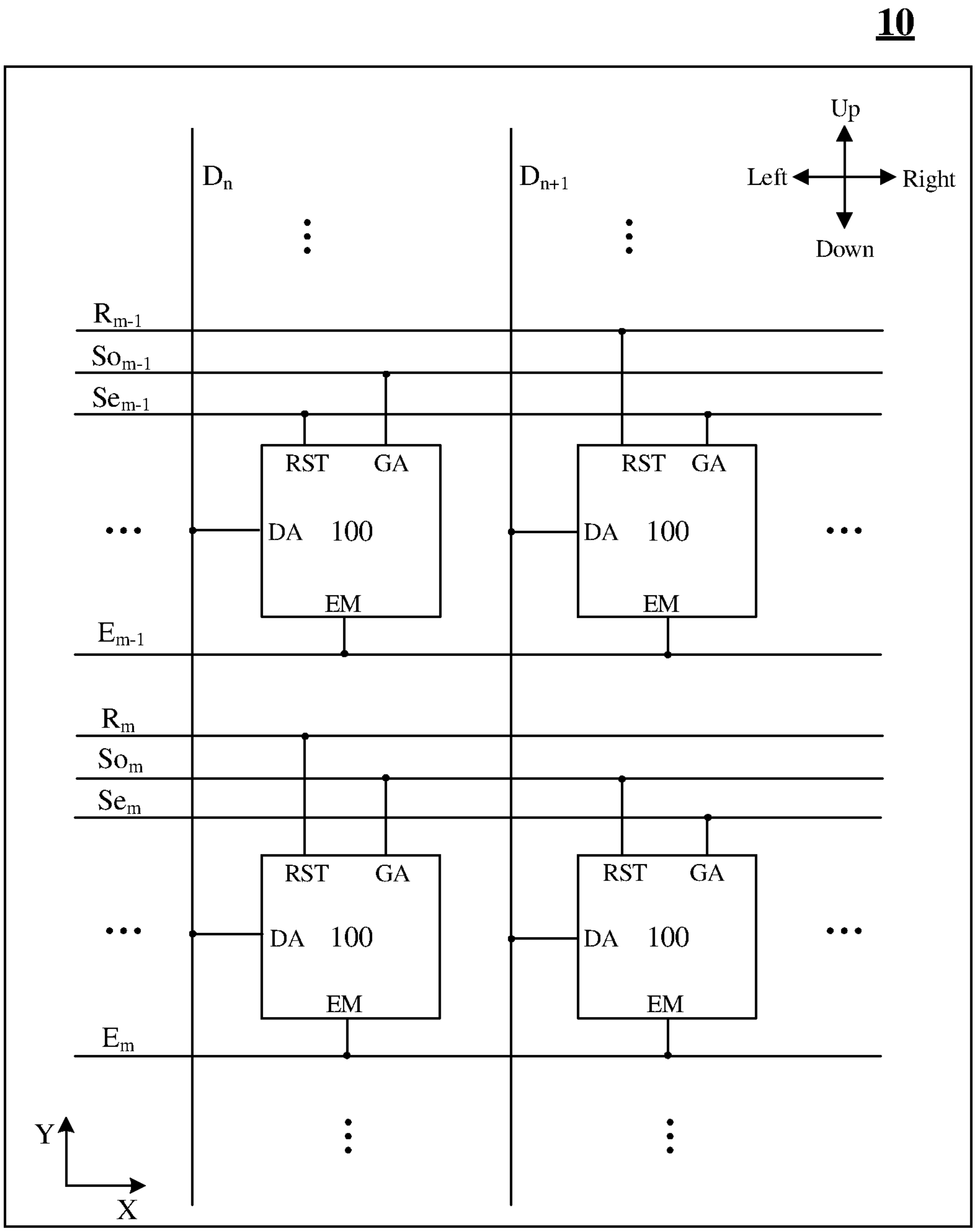
FIG. 3B is still another schematically structural diagram of the array substrate provided by the embodiments of the present disclosure.

FIG. 3A is yet another schematically structural diagram of the array substrate provided by the embodiments of the present disclosure. FIG. 3B is still another schematically structural diagram of the array substrate provided by the embodiments of the present disclosure.

As shown in FIGS. 3A and 3B, the array substrate 10 further includes a plurality of reset signal lines R disposed on a base substrate. For example, the plurality of reset signal lines R are disposed on the base substrate along a first direction. In the array substrate 10 shown in FIGS. 3A and 3B, a reset signal terminal RST of a pixel unit of an (n+1)th column in an mth row of pixel units is connected to a first gate line $So_m$ in an mth pair of gate lines $S_m$ to receive a first scan signal and uses the first scan signal as a first reset signal, so as to reset the pixel unit of the (n+1)th column in the mth row of pixel units.

As shown in FIGS. 3A and 3B, the plurality of reset signal lines R are in one-to-one correspondence with a plurality of rows of pixel units, and pixel units of each row are connected to corresponding one of the reset signal lines R. For example, the mth row of pixel units corresponds to the mth reset signal line R, and a reset signal terminal RST of the pixel unit of an nth column in the mth row of pixel units is connected to an mth reset signal line $R_m$ to receive a second reset signal, so as to reset the pixel unit of the nth column in the mth row of pixel units.

It should be noted that, although it is shown in FIGS. 3A and 3B that the first gate line $Se_m$ and the second gate line $So_m$ in the mth pair of gate lines $S_m$ as well as the mth reset signal line $R_m$ are arranged on the same side of the mth row of pixel units, the embodiments of the present disclosure are not limited thereto. For example, the first gate line $Se_m$ and the second gate line $So_m$ in the mth pair of gate lines $S_m$ as well as the mth reset signal line $R_m$ may be disposed on two opposite sides of the mth row of pixel units. For example, the mth reset signal line $R_m$ is arranged on an upper side of the mth row of pixel units, while both the first gate line $Se_m$ and the second gate line $So_m$ in the mth pair of gate lines $S_m$ are arranged on a lower side of the mth row of pixel units.

As shown in FIG. 3A, a reset signal terminal RST of the pixel unit of the nth column in a (m−1)th row of pixel units is connected to the (m−1)th reset signal line $R_{m-1}$ to receive a second reset signal, so as to reset the pixel unit of the nth column in the (m−1)th row of pixel units; m is an integer greater than 1. In this case, a reset signal terminal RST of the pixel unit of an (n+1)th column in the (m−1)th row of pixel units is connected to the first gate line $So_{m-1}$ of a (m−1)th pair of gate lines $S_{m-1}$ to receive a first scan signal and uses the first scan signal as a first reset signal, so as to reset the pixel unit of the (n+1)th column in the (m−1)th row of pixel units.

With reference to FIG. 3A, the manner in which the pixel units of the nth and (n+1)th columns in the (m−1)th row of pixel units are reset may be same as the manner in which the pixel units of the nth and (n+1)th columns in the mth row of pixel units are reset. For example, with respect to the working cycles of the pixel units respectively in the (m−1)th and mth rows, among the pixel units of the mth and the (m−1)th rows, the pixel unit of the nth column is reset by the second reset signal which is separately provided, and the pixel unit of the (n+1)th column is reset by the first scan signal which is provided for the pixel units of the nth column and used as the second reset signal.

As shown in FIG. 3B, a reset signal terminal RST of the pixel unit of an (n+1)th column in the (m−1)th row of pixel units is connected to a (m−1)th reset signal line $R_{m-1}$ to receive a first reset signal, so as to reset the pixel unit of the (n+1)th column in the (m−1)th row of pixel units. In this case, a reset signal terminal RST of the pixel unit of an nth column in the (m−1)th row of pixel units is connected to a second gate line $Se_{m-1}$ of a (m−1)th pair of gate lines $S_{m-1}$ to receive a second reset signal and uses the second reset signal as a second reset signal, so as to reset the pixel unit of the nth column in the (m−1)th row of pixel units.

With reference to FIG. 3B, the manner in which the pixel units of the nth and (n+1)th columns in the (m−1)th row of pixel units are reset may be different from the manner in which the pixel units of the nth and (n+1)th columns in the mth row of pixel units are reset. For example, with respect to the working cycles of the pixel units respectively in the (m−1)th and mth rows, among the (m−1)th row of pixel units, the pixel unit of the nth column is reset by the second scan signal which is provided for the pixel units of the (n+1)th column and used as the second reset signal, and the pixel unit of the (n+1)th column is reset by the first scan signal which is separately provided. Among the mth row of pixel units, the pixel unit of the nth column is reset by the second reset signal which is separately provided, and the pixel unit of the (n+1)th column is reset by the first scan signal which is provided for the pixel unit of the nth column and used as the first reset signal.

It should be noted that, in the embodiments of the present disclosure and for distinguishing purpose, the signal for resetting the pixel units of the (n+1)th column is called the first reset signal, and the signal for resetting the pixel units of the nth column is called the second reset signal. For example, in this case, as shown in FIGS. 3A and 3B, among the mth row of pixel units, the pixel unit of the nth column receives the second reset signal from the mth reset signal line $R_m$, and the pixel unit of the (n+1)th column receives the first scan signal from the first gate line $S_{om}$ of the mth pair of gate lines $S_m$ and uses the first scan signal as the first reset signal. As shown in FIG. 3A, among the (m−1)th row of pixel units, the pixel unit of the nth column receives the second reset signal from the (m−1)th reset signal line $R_{m-1}$, and the pixel unit of the (n+1)th column receives the first scan signal from the first gate line $S_{om-1}$ of the (m−1)th pair of gate lines $S_{m-1}$ uses the first scan signal as the first reset signal. As shown in FIG. 3B, in the (m−1)th row of pixel units, the pixel unit of the nth column receives the second scan signal from the second gate line $S_{em-1}$ of the (m−1)th pair of gate lines $S_{m-1}$ and uses the second scan signal as the second reset signal, and the pixel unit of the (n+1)th column receives the first reset signal from the (m−1)th reset signal line $R_{m-1}$.

For the sake of brevity, only the plurality of reset signal lines R in FIGS. 3A and 3B are described in detail here. Regarding a plurality of pairs of gate lines S, a plurality of data lines D, a plurality of light-emitting control signals line E, and a plurality of pixel units 110 in FIGS. 3A and 3B, reference may be made to the related description for the plurality of pairs of gate lines S, the plurality of data lines D, the plurality of light-emitting control signals line E, and the plurality of pixel units 100 in FIGS. 2A and 2B, which are not repeated here.

It should be noted that in FIGS. 2A, 2B, 3A, and 3B, although the plurality of pairs of gate lines S, the plurality of reset signal lines R, and the plurality of light-emitting control signal lines E are numbered successively from top to bottom, and the plurality of data lines D are numbered successively from left to right, but this is only for convenience of description, and does not limit the absolute position relationship of respective signal lines; the embodiments of the present disclosure are obviously not limited thereto. For example, the plurality of pairs of gate lines S, the plurality of reset signal lines R, and the plurality of light-emitting control signal lines E may be numbered successively from bottom to top, and/or the plurality of data lines D may be numbered successively from right to left.

The array substrate provided by at least one embodiment of the present disclosure may further include a first scan driving circuit disposed on a base substrate. The first scan driving circuit is connected to a plurality of reset signal lines and is configured to generate a second reset signal.

The array substrate provided by at least one embodiment of the present disclosure may further include a second scan driving circuit disposed on a base substrate. The second scan driving circuit is connected to a plurality of light-emitting control signal lines and is configured to generate a light-emitting control signal.

The array substrate provided by at least one embodiment of the present disclosure may further include a third scan driving circuit provided on a base substrate. The third scan driving circuit is connected to a plurality of pairs of gate lines and is configured to generate a first scan signal and a second scan signal.

Figure 4A:
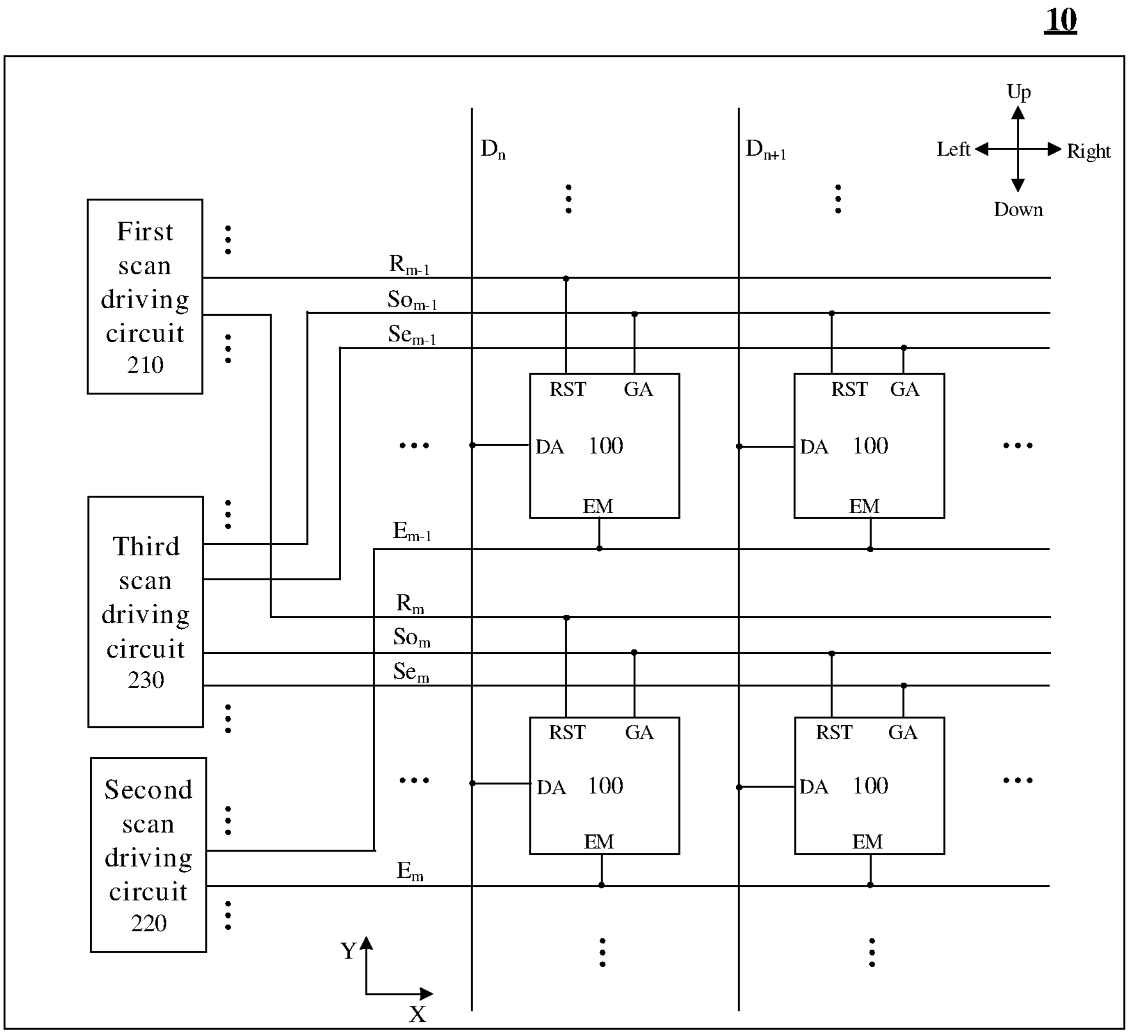
FIG. 4A is yet another schematically structural diagram of the array substrate provided by the embodiments of the present disclosure.

FIG. 4A is yet another schematic structural diagram of the array substrate provided by the embodiments of the present disclosure.

As shown in FIG. 4A, the array substrate 10 further includes a first scan driving circuit 210, a second scan driving circuit 220, and a third scan driving circuit 230 disposed on a base substrate.

As shown in FIG. 4A, the first scan driving circuit 210 is connected to a plurality of reset signal lines R and is configured to generate a second reset signal. For example, the first scan driving circuit 210 provides the second reset signal to a pixel unit of an nth column in an mth row of pixel units through an mth reset signal line $R_m$.

As shown in FIG. 4A, the second scan driving circuit 220 is connected to a plurality of light-emitting control signal lines E and is configured to generate a light-emitting control signal. For example, the second scan driving circuit 220 provides the light-emitting control signal to pixel units of the nth and the (n+1)th columns in the mth row of pixel units through an mth light-emitting control signal line Em.

As shown in FIG. 4A, the third scan driving circuit 230 is connected to the plurality of pairs of gate lines S and is configured to generate a first scan signal and a second scan signal. For example, the third scan driving circuit 230 provides the first scan signal to the pixel unit of the nth column in the mth row of pixel units through a first gate line $So_m$ in an (m)th pair of gate lines $S_m$, and provides the second scan signal to the pixel unit of the (n+1)th column in the mth row of pixel units through a second gate line $Se_m$ in the (m)th pair of gate lines $S_m$.

It should be noted that, although FIG. 4A shows that the second reset signal, the light-emitting control signal, the first scan signal and the second scan signal are respectively provided by the first scan driving circuit 210, the second scan driving circuit 220, and the third scan driving circuit 230, but the embodiments of the present disclosure are obviously not limited thereto. For example, the second reset signal, the light-emitting control signal, and the first scan signal and the second scan signal may be provided by the same larger scan driving circuit.

It should be noted that, although FIG. 4A shows that the first scan driving circuit 210, the second scan driving circuit 220, and the third scan driving circuit 230 are all disposed on a left side of an pixel array, the embodiments of the present disclosure are obviously not limited thereto. For example, the first scan driving circuit 210, the second scan driving circuit 220, and the third scan driving circuit 230 may all be arranged on a right side, an upper side, or a lower side of the pixel array; alternatively, the first scan driving circuit 210, the second scan driving circuit 220 and the third scan driving circuit 230 are respectively disposed on different sides of the pixel array.

For example, the first scan driving circuit 210, the second scan driving circuit 220, and the third scan driving circuit 230 shown in FIG. 4A are gate driving integrated circuits (chips), which are arranged on the base substrate by bonding or directly fabricated on the base substrate through a semiconductor process, that is, in the form of GOA. Moreover, although FIG. 4A shows that the first scan driving circuit 210, the second scan driving circuit 220, and the third scan driving circuit 230 are separately provided, the first scan driving circuit 210, the second scan driving circuit 220, and the third scan driving circuit 230 may be provided in a combined manner. For example, the first scan driving circuit 210, the second scan driving circuit 220, and the third scan driving circuit 230 are provided by the same gate driving integrated circuit, or fabricated in the same area of the base substrate. In the array substrate provided by another embodiment of the present disclosure, the third scan driving circuit includes a first scan driving sub-circuit and a second scan driving sub-circuit. The first scan driving sub-circuit is connected to a first gate line of each pair of gate lines and is configured to generate a first scan signal. The second scan driving sub-circuit is connected to a second gate line of each pair of gate lines and is configured to generate a second scan signal.

Figure 4B:
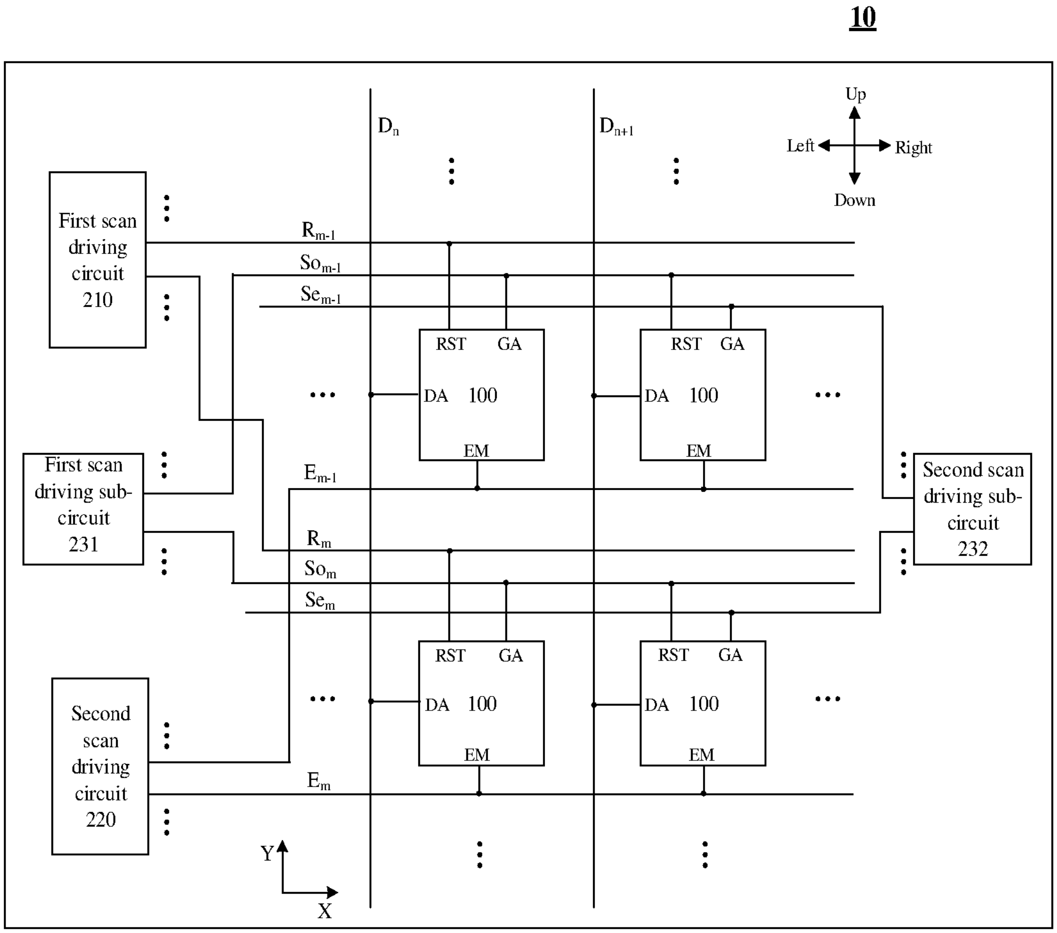
FIG. 4B is still another schematically structural diagram of the array substrate provided by the embodiments of the present disclosure.

FIG. 4B is still another schematic structural diagram of the array substrate provided by the embodiments of the present disclosure.

As shown in FIG. 4B, a third scan driving circuit 230 includes a first scan driving sub-circuit 231 and a second scan driving sub-circuit 232.

As shown in FIG. 4B, the first scan driving sub-circuit 231 is connected to a first gate line So in each pair of gate lines S and is configured to generate a first scan signal. For example, the first scan driving sub-circuit 231 provides the first scan signal for a pixel unit of an nth column in an mth row of pixel units through a first gate line $So_m$ of an mth pair of gate lines $S_m$.

As shown in FIG. 4B, the second scan driving sub-circuit 232 is connected to a second gate line Se in each pair of gate lines S and is configured to generate a second scan signal. For example, the second scan driving sub-circuit 232 provides the second scan signal for a pixel unit of an (n+1)th column in the mth row of pixel units through a second gate line $Se_m$ of the mth pair of gate lines $S_m$.

For the sake of brevity, only the first scan driving sub-circuit 231 and the second scan driving sub-circuit 232 in FIG. 4B are described in detail here. Regarding a first scan driving circuit 210 and a second scan driving circuit 220 in FIG. 4B, reference may be made to the related description for the first scan driving circuit 210 and the second scan driving circuit 220 in FIG. 4A, which are not repeated here.

It should be noted that, although FIG. 4B shows that the first scan driving sub-circuit 231 and the second scan driving sub-circuit 232 are respectively disposed on two opposite sides (left and right) of the pixel array, the embodiments of the present disclosure are obviously not limited thereto. For example, the first scan driving sub-circuit 231 and the second scan driving sub-circuit 232 are arranged on the same side of the pixel array. For example, the first scan driving sub-circuit 231 and the second scan driving sub-circuit 232 are both arranged on the left, right, upper or lower side of the pixel array.

It should be noted that, although the connection mode in which connection lines (for example, the plurality of pairs of gate lines S, the plurality of data lines D, the plurality of reset signal lines R, and the plurality of light-emitting control lines E) in the array substrate 10 of FIGS. 4A and 4B are connected with the pixel array is same as the connection mode of connection lines in the array substrate 10 of FIG. 3A, but the connection mode in which each connection line is connected with the pixel array in the array substrate 10 of FIGS. 4A and 4B may also adopt the connection mode in the array substrate 10 of FIG. 3B. Moreover, the connection mode in which each connection line in the array substrate 10 of FIGS. 4A and 4B are connected with the pixel array may also adopt the connection manner in the array substrate 10 in FIG. 2A or FIG. 2B. In this case, the array substrate 10 in FIGS. 4A and 4B may not include a plurality of reset signal lines R, and accordingly does not include the first scan driving circuit 210.

In the embodiments shown in FIGS. 2A to 4B, the plurality of columns of pixel units are in one-to-one correspondence with the plurality of data lines, but the embodiments of the present disclosure are obviously not limited thereto. For example, in a variation of the embodiment shown in FIGS. 2A to 4B, at least two columns of pixel units may correspond to one data line. For example, two adjacent columns of pixel units correspond to the same data line, and data signal terminals of the pixel units in the two adjacent columns are connected to the same data line to receive the same data signal (see the embodiment shown in FIG. 9B below), thereby realizing the sharing of data lines, reducing the number of data lines and the number of data driving circuits, and in turns reducing the manufacturing costs.

In the array substrate provided by the embodiment of the present disclosure, each pixel unit includes a pixel circuit and a light emitting element. The pixel circuit includes a reset circuit, a data writing and compensation circuit, a driving circuit, and a light-emitting control circuit. The reset circuit includes a reset signal terminal and is connected to a reset voltage source, a driving circuit and a light emitting element. The reset circuit is configured to apply a reset voltage to the driving circuit and the light emitting element to reset the driving circuit and the light emitting element. The data writing and compensation circuit includes a scan signal terminal and a data signal terminal and is connected to a driving circuit. The data writing and compensation circuit is configured to write a data signal into the driving circuit and compensate for the driving circuit. The driving circuit is configured to generate a driving current for driving a light emitting element to emit light. The light-emitting control circuit includes a light-emitting control signal terminal and is connected to a first voltage source, a driving circuit and a light emitting element. The light-emitting control circuit is configured to apply a first voltage to the driving circuit and apply the driving current generated by the driving circuit to the light emitting element.

Figure 5:
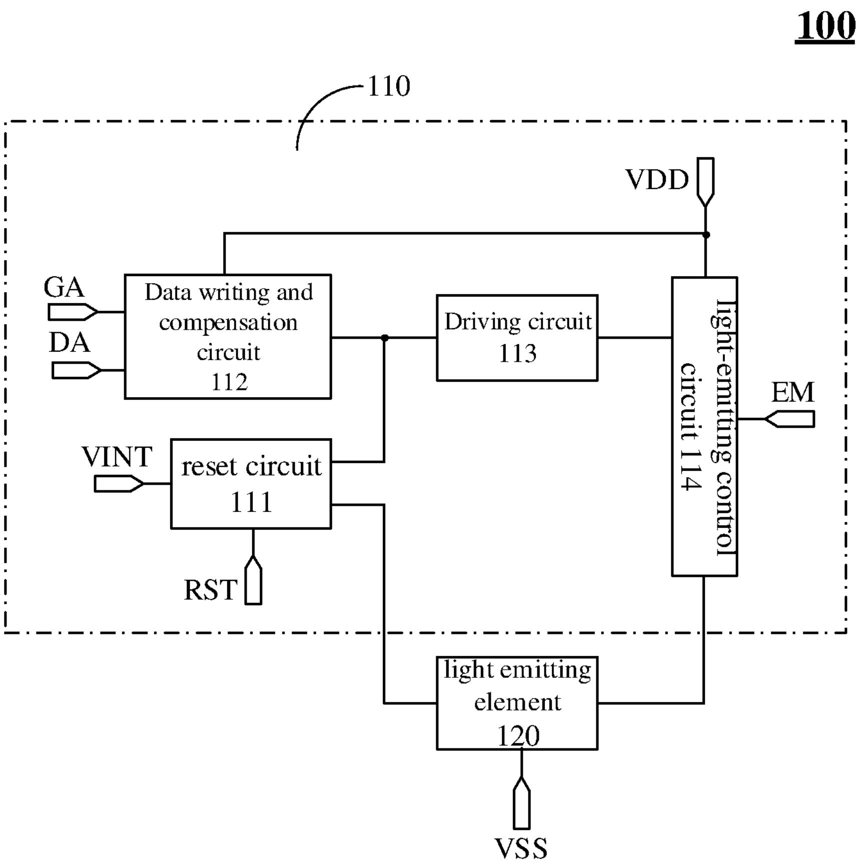
FIG. 5 is a schematically structural diagram of a pixel unit in the array substrate provided by the embodiments of the present disclosure.

FIG. 5 is a schematic structural diagram of the pixel unit in the array substrate provided by the embodiments of the present disclosure. As shown in FIG. 5, a pixel unit 100 includes a pixel circuit 110 and a light emitting element 120. The pixel circuit 110 includes a reset circuit 111, a data writing and compensation circuit 112, a driving circuit 113, and a light-emitting control circuit 114.

As shown in FIG. 5, the reset circuit 111 includes a reset signal terminal RST, and is connected to a reset voltage source VINT, the driving circuit 113, and the light emitting element 120. The reset circuit 111 is configured to apply a reset voltage received from the reset voltage source VINT to the driving circuit 113 and the light emitting element 120 under the control of a reset signal, so as to reset the driving circuit 113 and the light emitting element 120. For example, the reset signal herein may be the first reset signal or the second reset signal described in the previous embodiments, and the reset signal mentioned in the subsequent embodiments has a similar meaning to this, which is not repeated here.

As shown in FIG. 5, the data writing and compensation circuit 112 includes a scan signal terminal GA and a data signal terminal DA. The data writing and compensation circuit 112 is connected to the driving circuit 113 and is configured to write a data signal into the driving circuit 113 under the control of a scan signal so as to compensate for the driving circuit 113. For example, the scan signal herein may be the first scan signal or the second scan signal described in the previous embodiments, and the scan signal mentioned in the subsequent embodiment has a similar meaning to this, which is not repeated here.

As shown in FIG. 5, the driving circuit 113 is connected to the reset circuit 111, the data writing and compensation circuit 112, and the light-emitting control circuit 114, and the driving circuit 113 is configured to generate a driving current for driving the light emitting element 120 to emit light.

As shown in FIG. 5, the light-emitting control circuit 114 includes a light-emitting control signal terminal EM and is connected to a first voltage source VDD, the driving circuit 113 and the light emitting element 120. The light-emitting control circuit 114 is configured to apply a first voltage received from the first voltage source VDD to the driving circuit 113 under the control of the light emission control signal, and to apply a driving current generated by the driving circuit 113 to the light emitting element 120.

As shown in FIG. 5, the light emitting element 120 is connected to the second voltage source VSS, the reset circuit 111, and the light-emission control circuit 114, and the light emitting element 120 is configured to emit light under the driving of the driving current generated by the driving circuit 113.

For example, the light emitting element 120 is a light emitting diode or the like. The light emitting diode may be an organic light-emitting diode (OLED), or a quantum dot light-emitting diode (QLED), or the like.

In the array substrate provided by at least one embodiment of the present disclosure, a reset circuit includes a first reset transistor and a second reset transistor. A data writing and compensation circuit includes a data writing transistor, a compensation transistor, and a storage capacitor. A driving circuit includes a driving transistor. A light-emitting control circuit includes a first light-emitting control transistor and a second light-emitting control transistor. A gate electrode of the data writing transistor is connected to a scan signal terminal, a first electrode of the data writing transistor is connected to a data signal terminal, a second electrode of the data writing transistor is connected to a first electrode of the driving transistor. A gate electrode of the compensation transistor is connected to a scan signal terminal, a first electrode of the compensation transistor is connected to a second electrode of the driving transistor, a second electrode of the compensation transistor is connected to a gate electrode of the driving transistor. A first terminal of the storage capacitor is connected to a first voltage source, and a second terminal of the storage capacitor is connected to the gate electrode of the driving transistor. A gate electrode of the first reset transistor is connected to a reset signal terminal, a first terminal of the first reset transistor is connected to a reset voltage source, and a second terminal of the first reset transistor is connected to the gate electrode of the driving transistor. A gate electrode of the second reset transistor is connected to the reset signal terminal, a first electrode of the second reset transistor is connected to the reset voltage source, and a second electrode of the second reset transistor is connected to a first terminal of the light emitting element. A gate electrode of the first light-emitting control transistor is connected to the light-emitting control signal terminal, a first electrode of the first light-emitting control transistor is connected to the first voltage source, and a second electrode of the first light-emitting control transistor is connected to the first electrode of the driving transistor. A gate electrode of the second light-emitting control transistor is connected to the light-emitting control signal terminal, a first electrode of the second light-emitting control transistor is connected to a second electrode of the driving transistor, and a second electrode of the second light-emitting control transistor is connected to the first terminal of the light emitting element.

Figure 6:
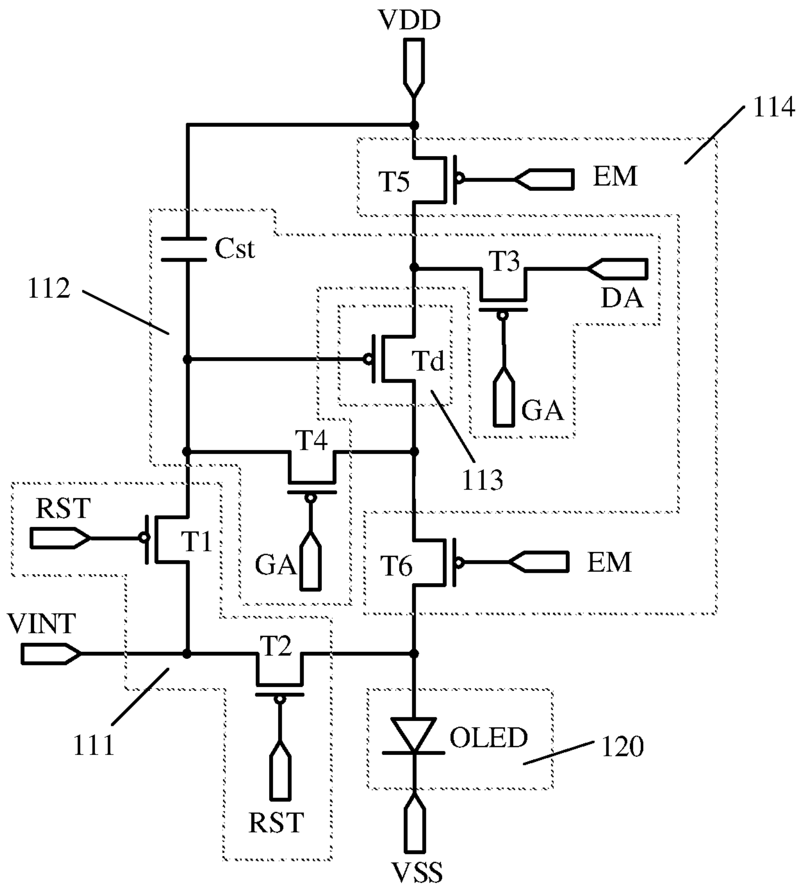
FIG. 6 is a schematically structural diagram of each circuit in a pixel circuit of FIG. 5.

FIG. 6 is a schematic diagram of the structure of each circuit in the pixel circuit in FIG. 5. As shown in FIG. 6, a reset circuit 111 includes a first reset transistor T1 and a second reset transistor T2. A data writing and compensation circuit 112 includes a data writing transistor T3, a compensation transistor T4, and a storage capacitor Cst. A driving circuit 113 includes a driving transistor Td. A light-emitting control circuit 114 includes a first light-emitting control transistor T5 and a second light-emitting control transistor T6.

As shown in FIG. 6, a gate electrode of the first reset transistor T1 is connected to a reset signal terminal RST to receive a reset signal. A first electrode of the first reset transistor T1 is connected to a reset voltage source VINT to receive a first voltage. A second electrode of the first reset transistor T1 is connected to a gate electrode of the driving transistor Td.

As shown in FIG. 6, a gate electrode of the second reset transistor T2 is connected to the reset signal terminal RST to receive a reset signal. A first electrode of the second reset transistor T2 is connected to the reset voltage source VINT to receive a first voltage. A second electrode of the second reset transistor T2 is connected to a first terminal of the light emitting element 120.

As shown in FIG. 6, a gate electrode of the data writing transistor T3 is connected to a scan signal terminal GA to receive a scan signal. A first electrode of the data writing transistor T3 is connected to a data signal terminal to receive a data signal. A second electrode of the data writing transistor T3 is connected to a first electrode of the driving transistor Td.

As shown in FIG. 6, a gate electrode of the compensation transistor T4 is connected to the scan signal terminal GA to receive a scan signal. A first electrode of the compensation transistor T4 is connected to a second electrode of the driving transistor Td. A second electrode of the compensation transistor T4 is connected to a gate electrode of the driving transistor Td.

As shown in FIG. 6, a first terminal of the storage capacitor Cst is connected to a first voltage source, and a second terminal of the storage capacitor Cst is connected to a gate electrode of the driving transistor Td.

As shown in FIG. 6, a gate electrode of the first light-emitting control transistor T5 is connected to a light-emitting control signal terminal EM to receive a light-emitting control signal. A first electrode of the first light-emitting control transistor T5 is connected to a first voltage source VDD to receive a first voltage. A second electrode of the first light-emitting control transistor T5 is connected to a first electrode of the driving transistor T5.

As shown in FIG. 6, a gate electrode of the second light-emitting control transistor T6 is connected to the light-emitting control signal terminal EM to receive a light-emitting control signal. A first electrode of the second light-emitting control transistor T6 is connected to a second electrode of the driving transistor Td. A second electrode of the second light-emitting transistor T6 is connected to a first terminal of the light emitting element 120.

As shown in FIG. 6, a second terminal of the light emitting element 120 is connected to a second voltage source VSS to receive a second voltage. For example, as shown in FIG. 6, the light emitting element 120 is an organic light-emitting diode (OLED). An anode of the OLED is the first terminal of the light emitting element 120, and a cathode of the OLED is the second terminal of the light emitting element 120.

It should be noted that, in the embodiments of the present disclosure, the reset voltage source VINT is to input a low voltage, the first voltage source VDD is to input a high voltage, and the second voltage source VSS is to input a low voltage, or the second terminal of the light emitting element 120 is grounded, all of which is taken as examples for description. Moreover, the high and low voltages herein only indicate the relative magnitude relationship between the input voltages.

It should be noted that the transistors used in the embodiments of the present disclosure may all be thin film transistors, or field effect transistors, or other switching devices with the same characteristics. In the embodiments of the present disclosure, thin film transistors are used as examples for description. Source and drain electrodes of the transistor used herein may be symmetrical in structure, so there is no structural difference between the source and drain electrodes. In the embodiments of the present disclosure, in order to distinguish the two electrodes of the transistor other than the gate electrode, one of the two electrodes is directly defined as a first electrode, and the other electrode is defined as a second electrode.

Moreover, it should be noted that all the transistors used in the embodiments of the present disclosure may be P-type transistors or N-type transistors. It is only necessary to connect the electrodes of the selected type of transistor with reference to the electrodes of the corresponding transistor in the embodiment of the present disclosure, and to make the corresponding voltage terminal provide the corresponding high voltage or low voltage. For example, for an N-type transistor, an input terminal is a drain electrode, and an output terminal is a source electrode, and a control terminal is a gate electrode. For a P-type transistor, an input terminal is a source electrode, and an output terminal is a drain electrode, and a control terminal is a gate electrode. For different types of transistors, their control terminals may have different level of control signals. For example, for an N-type transistor, when the control signal is at a high level, the N-type transistor is in ON state; and when the control signal is at a low level, the N-type transistor is in OFF state. For a P-type transistor, when the control signal is at a low level, the P-type transistor is in ON state; and when the control signal is at a high level, the P-type transistor is in OFF state. When N-type transistors are adopted, oxide semiconductors, such as Indium Gallium Zinc Oxide (IGZO), may be used as an active layer of a thin film transistor. Compared with the active layer of thin film transistors using Low Temperature Poly Silicon (LTPS) or amorphous silicon (such as hydrogenated amorphous silicon), the active layer using oxide semiconductors can effectively reduce the size of the transistor and prevent leakage current. Low temperature polysilicon generally refers to a situation where the crystallization temperature of polysilicon obtained from the crystallization of amorphous silicon is lower than 600 degrees Celsius.

Figure 7:
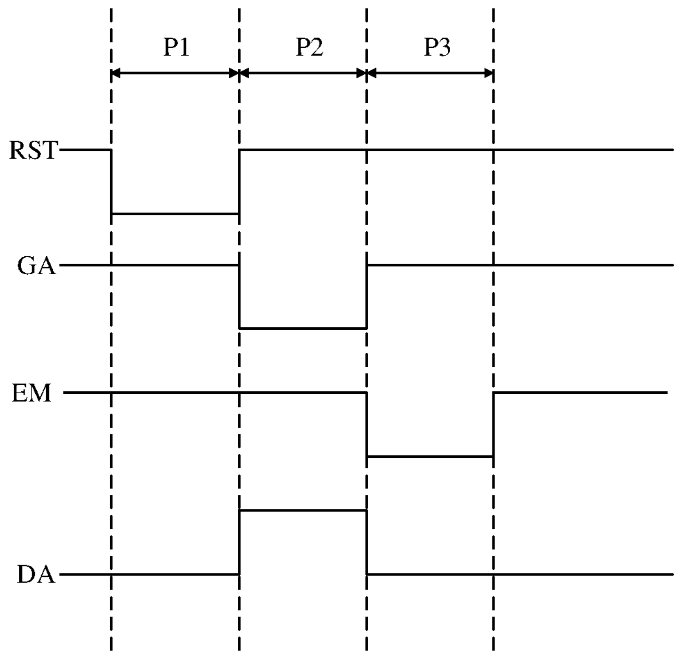
FIG. 7 is a timing diagram of signals for driving the pixel circuit of FIG. 6.

FIG. 7 is a timing diagram of signals for driving the pixel circuit of FIG. 6. As shown in FIG. 7, the working process of the pixel circuit 110 includes three stages, namely, a reset stage P1, a data writing and compensation stage P2, and a light-emitting stage P3.

Figure 8A:
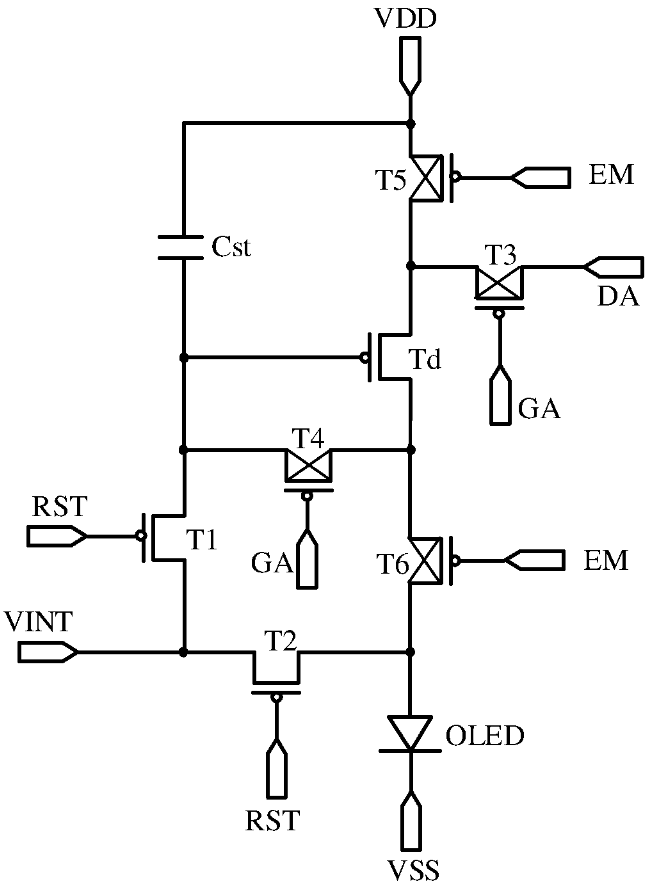
FIG. 8A is an equivalent circuit diagram of the pixel circuit shown in FIG. 6 in a reset stage.
Figure 8B:
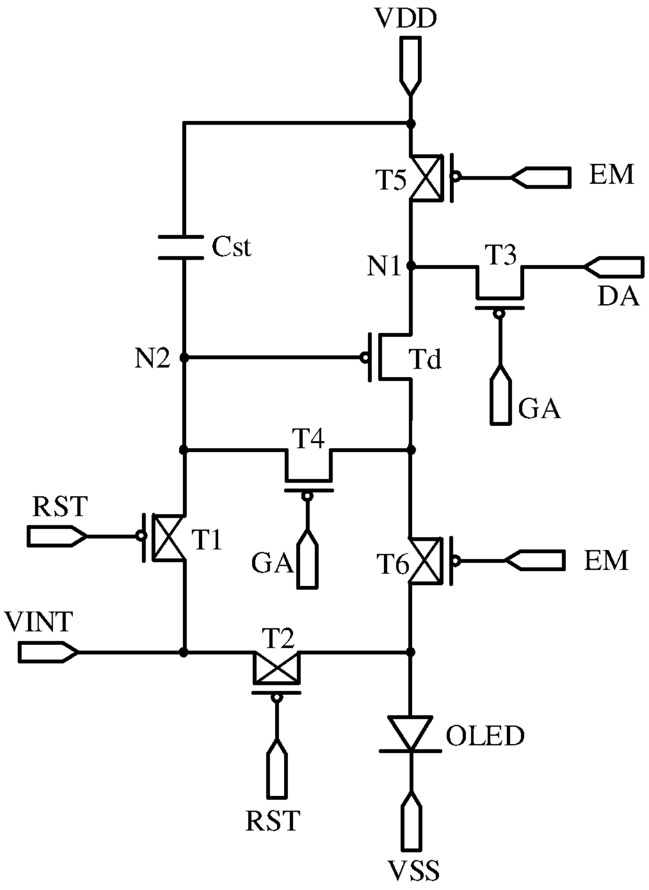
FIG. 8B is an equivalent circuit diagram of the pixel circuit shown in FIG. 6 in a data writing and compensation stage.
Figure 8C:
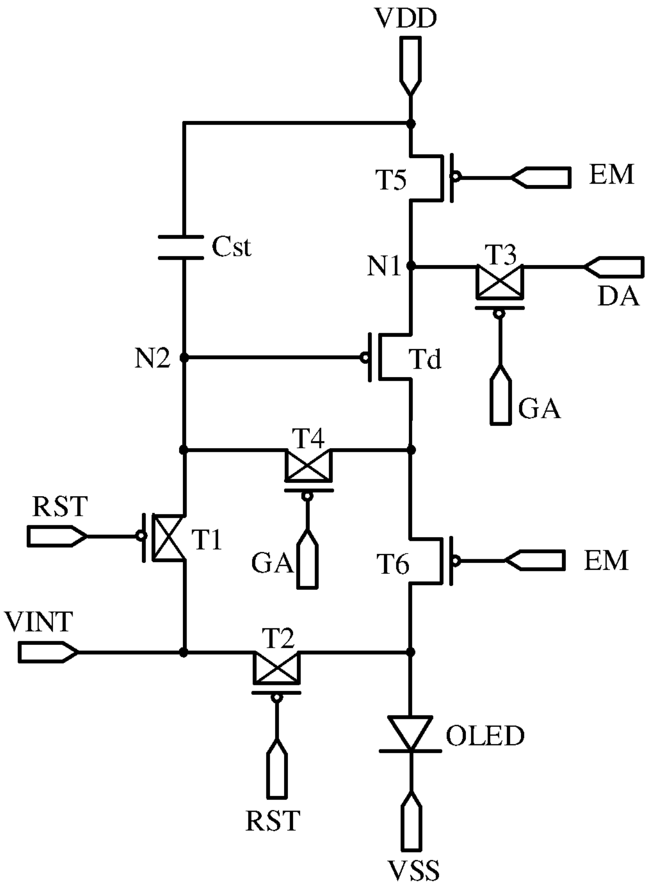
FIG. 8C is an equivalent circuit diagram of the pixel circuit shown in FIG. 6 in a light-emitting stage.

FIG. 8A is an equivalent circuit diagram of the pixel circuit shown in FIG. 6 in the reset stage. FIG. 8B is an equivalent circuit diagram of the pixel circuit shown in FIG. 6 in the data writing and compensation stage. FIG. 8C is an equivalent circuit diagram of the pixel circuit shown in FIG. 6 in the light-emitting stage.

In FIG. 7 and FIGS. 8A, 8B, and 8C, VDD, VSS, and VINT are used to indicate not only corresponding voltage sources but also corresponding voltages. RST, GA, DA, and EM are used to indicate not only corresponding signal terminals but also corresponding signals. Moreover, the transistors marked with " x " in FIGS. 8A, 8B and 8C all indicate that the transistor is in OFF state in corresponding stage.

In the following, the situation where the first reset transistor T1, the second reset transistor T2, the data writing transistor T3, the compensation transistor T4, the driving transistor Td, the first light-emitting control transistor T5, and the second light-emitting control transistor T6 are all P-type transistors is taken as an example, and the working process of the pixel circuit in FIG. 6 will be described as below in conjunction with FIG. 7 and FIGS. 8A, 8B, and 8C.

As shown in FIG. 7, in the reset stage P1, a low-level reset signal RST, a high-level scan signal GA, a high-level light-emitting control signal EM, and a low-level data signal DA are input.

In the reset stage P1, as shown in FIG. 8A, a gate electrode of the first reset transistor T1 receives the low-level reset signal RST, and the first reset transistor T1 is conducted. Thus, a reset voltage VINT is applied to a gate electrode of the driving transistor Td to reset the gate electrode of the driving transistor Td, and the driving transistor Td in ON state enters the data writing and compensation stage P2.

In the reset stage P1, as shown in FIG. 8A, a gate electrode of the second reset transistor T2 receives a low-level reset signal RST, and the second reset transistor T2 is conducted. Thus, a reset voltage VINT is applied to an anode of an OLED to reset the anode of the OLED, and the OLED does not emit light before the light-emitting stage P3.

Moreover, in the reset stage P1, as shown in FIG. 8A, a gate electrode of the data writing transistor T3 receives a high-level scan signal GA, and the data writing transistor T3 is cut off. A gate electrode of the compensation transistor T4 receives a high-level scan signal GA, and the compensation transistor T4 is cut off. A gate electrode of the first light-emitting control transistor T5 receives the high-level light-emitting control signal EM, and the first light-emitting control transistor T5 is cut off. A gate electrode of the second light-emitting control transistor T6 receives the high-level light-emitting control signal EM, and the second light-emitting control transistor T6 is cut off.

As shown in FIG. 7, in the data writing and compensation stage P2, a high-level reset signal RST, a low-level scan signal GA, a high-level light-emitting control signal EM, and a high-level data signal DA are input.

In the data writing and compensation stage P2, as shown in FIG. 8B, the gate electrode of the data writing transistor T3 receives the low-level scan signal GA, and the data writing transistor T3 is conducted. Thus, a data signal is written into a first node N1 (i.e., a first electrode of the driving transistor Td). The gate electrode of the compensation transistor T4 receives the low-level scan signal GA, and the compensation transistor T3 is conducted. Because the data writing transistor T3, the driving transistor Td, and the compensation transistor T4 are all conducted, the data signal DA charges the storage capacitor Cst through the data writing transistor T3, the driving transistor Td, and the compensation transistor T4, that is, a second node N2 (i.e., the gate electrode of the driving transistor Td) is charged, and the voltage of a third node N3 is gradually increased.

It is easy to understand that in the data writing and compensation stage P2, because the data writing transistor T3 is conducted, the voltage of the first node N1 remains at Vda. At the same time, according to the characteristics of the driving transistor Td, when the voltage of the second node N2 is increased to Vda+Vth, the driving transistor Td is cut off and the charging process ends. Herein, Vda represents a voltage of the data signal DA, and Vth represents a threshold voltage of the driving transistor Td. In this embodiment, the driving transistor T1 is described by using a P-type transistor as an example, so the threshold voltage Vth here is a negative value.

After the data writing and compensation stage 2, the voltage of the second node N2 is Vdata+Vth, that is, the voltage information of the data signal DA and the threshold voltage Vth is stored in the storage capacitor Cst, in order to compensate for the threshold voltage of the driving transistor Td during the subsequent light-emitting stage P3.

Moreover, in the data writing and compensation stage P2, as shown in FIG. 8B, the gate electrode of the first reset transistor T1 receives the high-level reset signal RST, and the first reset transistor T1 is cut off. The gate electrode of the second reset transistor T2 receives a high-level reset signal, and the second reset transistor T2 is cut off. The gate electrode of the first light-emitting control transistor T5 receives a high-level light-emitting control signal EM, and the first light-emitting control transistor T5 is cut off. The gate electrode of the second light-emitting control transistor T6 receives the high-level light-emitting control signal EM, and the second light-emitting control transistor T6 is cut off.

As shown in FIG. 7, in the light-emitting stage P3, a high-level reset signal RST, a high-level scan signal GA, a low-level light-emitting control signal EM, and a low-level data signal DA are input.

In the light-emitting stage P3, as shown in FIG. 8C, the gate electrode of the first light-emitting control transistor T5 receives the low-level light-emitting control signal EM, and the first light-emitting control transistor T5 is conducted. Thus, a first voltage VDD is applied to the first node N1 (i.e., the first electrode of the driving transistor Td). The gate electrode of the second light-emitting control transistor T6 receives the low-level light-emitting control signal EM, and the second light-emitting control transistor T6 is conducted. Thus, a driving current generated by the driving transistor Td is applied to the OLED.

Moreover, in the light-emitting stage P3, as shown in FIG. 8C, the gate electrode of the first reset transistor T1 receives the high-level reset signal RST, and the first reset transistor T1 is cut off. The gate electrode of the second reset transistor T2 receives the high-level reset signal, and the second reset transistor T2 is cut off. The gate electrode of the data writing transistor T3 receives the high-level scan signal GA, and the data writing transistor T3 is cut off. The gate electrode of the compensation transistor T4 receives the high-level scan signal GA, and the compensation transistor T4 is cut off.

It is easy to understand that in the light-emitting stage P3, because the first light-emitting control transistor T5 is conducted, the voltage of the first node N1 is VDD, and the voltage of the second node N2 is Vdata+Vth, thus, the driving transistor Td is also conducted.

In the light-emitting stage P3, as shown in FIG. 8C, the anode and cathode of the OLED are respectively connected to the first voltage VDD (high voltage) and the second voltage VSS (low voltage), so that the OLED emits light under the drive of the driving current generated by the driving transistor Td.

Based on the saturation current formula of the driving transistor Td, a driving current ID for driving the OLED to emit light may be obtained according to the following formula:

$$I_D = K(V_{GS} - Vth)^2 = K[(Vda + Vth - VDD) - Vth]^2 = K(Vda - VDD)^2$$

In the above formula, Vth represents a threshold voltage of the driving transistor Td, VGS represents a voltage between the gate electrode and the source electrode of the driving transistor Td, and K is a constant. It can be seen from the above formula that the driving current ID flowing through the OLED is no longer related to the threshold voltage Vth of the driving transistor Td, but only related to the voltage Vda of the data signal DA, thereby achieving the compensation for the threshold voltage Vth of the driving transistor Td, solving the problem of the threshold voltage drift of the driving transistor Td due to the process and long-term operation, eliminating the influence on the driving current ID, and in turns increasing the display effect.

For example, K in the above formula may be expressed as:

$$K = 0.5\mu_n C_{ox}(W/L),$$

Among them, $\mu_n$ is an electron mobility of the driving transistor Td, $C_{ox}$ is the unit capacitance of the gate electrode of the driving transistor Td, W is a channel width of the driving transistor Td, and L is a channel length of the driving transistor Td.

Figure 9A:
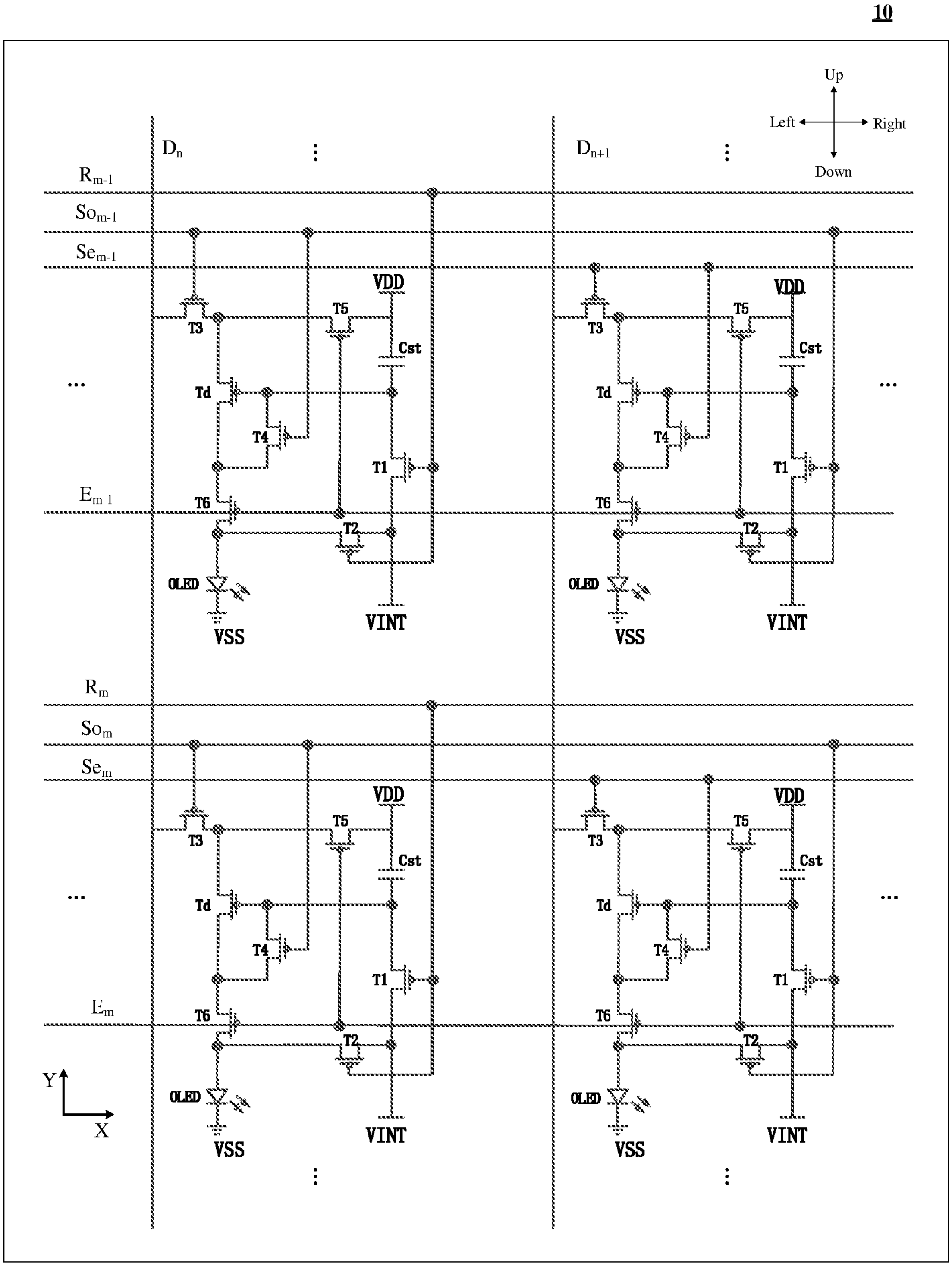
FIG. 9A is a schematically structural diagram of the array substrate provided by the embodiments of the present disclosure in which the array substrate includes the pixel circuit of FIG. 6.

FIG. 9A is a schematic structural diagram of the array substrate provided by embodiments of the present disclosure in which the array substrate includes the pixel circuit of FIG. 6.

As shown in FIG. 9A, in a pixel unit of an nth column among an mth row of pixel units, a gate electrode of a first reset transistor T1 and a gate electrode of a second reset transistor T2 are connected to an (m−1)th reset signal line $R_{2-1}$ to receive a second reset signal. A gate electrode of a data writing transistor T3 and a gate electrode of a compensation transistor T4 are connected to a first gate line $So_{m-1}$ of an (m−1)th pair of gate lines $S_{m-1}$ to receive a first scan signal. A first electrode of a data writing transistor T3 is connected to an nth data line $D_n$ to receive a data signal. A gate electrode of a first light-emitting control transistor T5 and a gate electrode of a second light-emitting control transistor T6 are connected to an (m−1)th light-emitting control signal line $E_{m-1}$ to receive a light-emitting control signal.

As shown in FIG. 9A, in an pixel unit of an (n+1)th column among the pixels unit of the (m−1)th row, a gate electrode of a first reset transistor T1 and a gate electrode of a second reset transistor T2 are connected to the first gate line $So_{m-1}$in the (m−1)th pair of gates line $S_{m-1}$ to receive a first scan signal and use the first scan signal as a first reset signal. A gate electrode of a data writing transistor T3 and a gate electrode of a compensation transistor T4 are connected to a second gate line $Se_{m-1}$ in an (m−1)th pair of gate lines $S_{m-1}$ to receive a second scan signal. A first electrode of a data writing transistor T3 is connected to an (n+1)th data line $D_{m+1}$ to receive a data signal. A gate electrode of a first light-emitting control transistor T5 and a gate electrode of a second light-emitting control transistor T6 are connected to the (m−1)th light-emitting control signal line $E_{m-1}$ to receive a light-emitting control signal.

As shown in FIG. 9A, in the pixel unit of the nth column among an mth row of pixel units, a gate electrode of a first reset transistor T1 and a gate electrode of a second reset transistor T2 are connected to an mth reset signal line $R_m$ to receive a second reset signal. A gate electrode of a data writing transistor T3 and a gate electrode of a compensation transistor T4 are connected to a first gate line $So_m$ of an mth pair of gate lines $S_m$ to receive a first scan signal. A first electrode of a data writing transistor T3 is connected to an nth data line $D_n$ to receive a data signal. A gate electrode of a first light-emitting control transistor T5 and a gate electrode of a second light-emitting control transistor T6 are connected to the mth light-emitting control signal line $E_m$ to receive a light-emitting control signal.

As shown in FIG. 9A, in the pixel unit of the (n+1)th column among the mth row of pixel units, a gate electrode of a first reset transistor T1 and a gate electrode of a second reset transistor T2 are connected to the first gate line $So_m$ of the mth pair of gate lines $S_m$ to receive a first scan signal and use the first scan signal as a first reset signal. A gate electrode of a data writing transistor T3 and a gate electrode of a compensation transistor T4 are connected to a second gate line $Se_m$ in the mth pair of gate lines $S_m$ to receive a second scan signal. A first electrode of a data writing transistor T3 is connected to the (n+1) data line $D_{n+1}$ to receive a data signal. A gate electrode of the first light-emitting control transistor T5 and a gate electrode of a second light-emitting control transistor T6 are connected to the mth light-emitting control signal line $E_m$ to receive a light-emitting control signal.

It should be noted that, although the array substrate 10 shown in FIG. 9A includes the pixel circuit of FIG. 6 and adopts the structure of the array substrate 10 shown in FIG. 3A, the embodiments of the present disclosure are obviously not limited thereto. The array substrate 10 shown in FIG. 9A may adopt the structure of the array substrate 10 in FIG. 2A, FIG. 2B or FIG. 3B.

For example, in a situation where the array substrate including the pixel circuit in FIG. 6 adopts the structure of the array substrate 10 in FIG. 2A, the array substrate may not include the reset signal line R. In a pixel unit of an nth column among an (m−1)th row of pixel units, a gate electrode of a first reset transistor T1 and a gate electrode of a second reset transistor T2 are connected to a second gate line $Se_{m-1}$ of an (m−1) pair of gate lines $S_{m-1}$ to receive a second scan signal as a first reset signal. In a pixel unit of the nth column among an mth row of pixel units, a gate electrode of a first reset transistor T1 and a gate electrode of a second reset transistor T2 are connected to a first gate line $So_{m-1}$ in an (m−1)th pair of gate lines $S_{m-1}$ to receives a first scan signal as a second reset signal. In this case, regarding the connection mode of other transistors in pixel units of the nth and (n+1)th columns among the (m−1)th row of pixel units and the connection mode of other transistors in pixel units of the nth and (n+1)th columns among the mth row of pixel units, references may be made to the above related description of the array substrate 10 in FIG. 9A (i.e., the structure of the array substrate 10 in FIG. 3A is adopted), which are not repeated here.

For example, in a situation where the array substrate including the pixel circuit in FIG. 6 adopts the structure of the array substrate 10 in FIG. 2B, the array substrate may not include the reset signal line R. In a pixel unit of an nth column among an mth row of pixel units, a gate electrode of a first reset transistor T1 and a gate electrode of a second reset transistor T2 are connected to a second gate line $Se_{m-1}$ of the (m−1)th pair of gate lines $S_{m-1}$ to receive a second scan signal as a second reset signal. In this case, regarding the connection mode of other transistors in pixel units of the nth and (n+1)th columns among the (m−1)th row of pixel units and the connection mode of other transistors in pixel units of the nth and (n+1)th columns among the mth row of pixel units, references may be made to the above related description of the array substrate 10 in FIG. 9A (i.e., the structure of the array substrate 10 in FIG. 3A is adopted), which are not repeated here.

For example, in a situation where the array substrate including the pixel circuit in FIG. 6 adopts the structure of the array substrate 10 in FIG. 3B, in a pixel unit of an nth column among an (m−1)th row of pixel units, a gate electrode of a first reset transistor T1 and a gate electrode of a second reset transistor T2 are connected to a second gate line $Se_{m-1}$ of the (m−1)th pair of gate lines $S_{m-1}$ to receive a second scan signal as a second reset signal. In a pixel unit of an (n+1)th column among the (m−1)th row of pixel units, a gate electrode of a first reset transistor T1 and a gate electrode of a second reset transistor T2 are connected to an (m−1)th reset signal line $R_{m-1}$. In this case, regarding the connection mode of other transistors in pixel units of the nth and (n+1)th columns among the (m−1)th row of pixel units and the connection mode of other transistors in pixel units of the nth and (n+1)th columns among the mth row of pixel units, references may be made to the above related description of the array substrate 10 in FIG. 9A (i.e., the structure of the array substrate 10 in FIG. 3A is adopted), which are not repeated here.

Figure 9B:
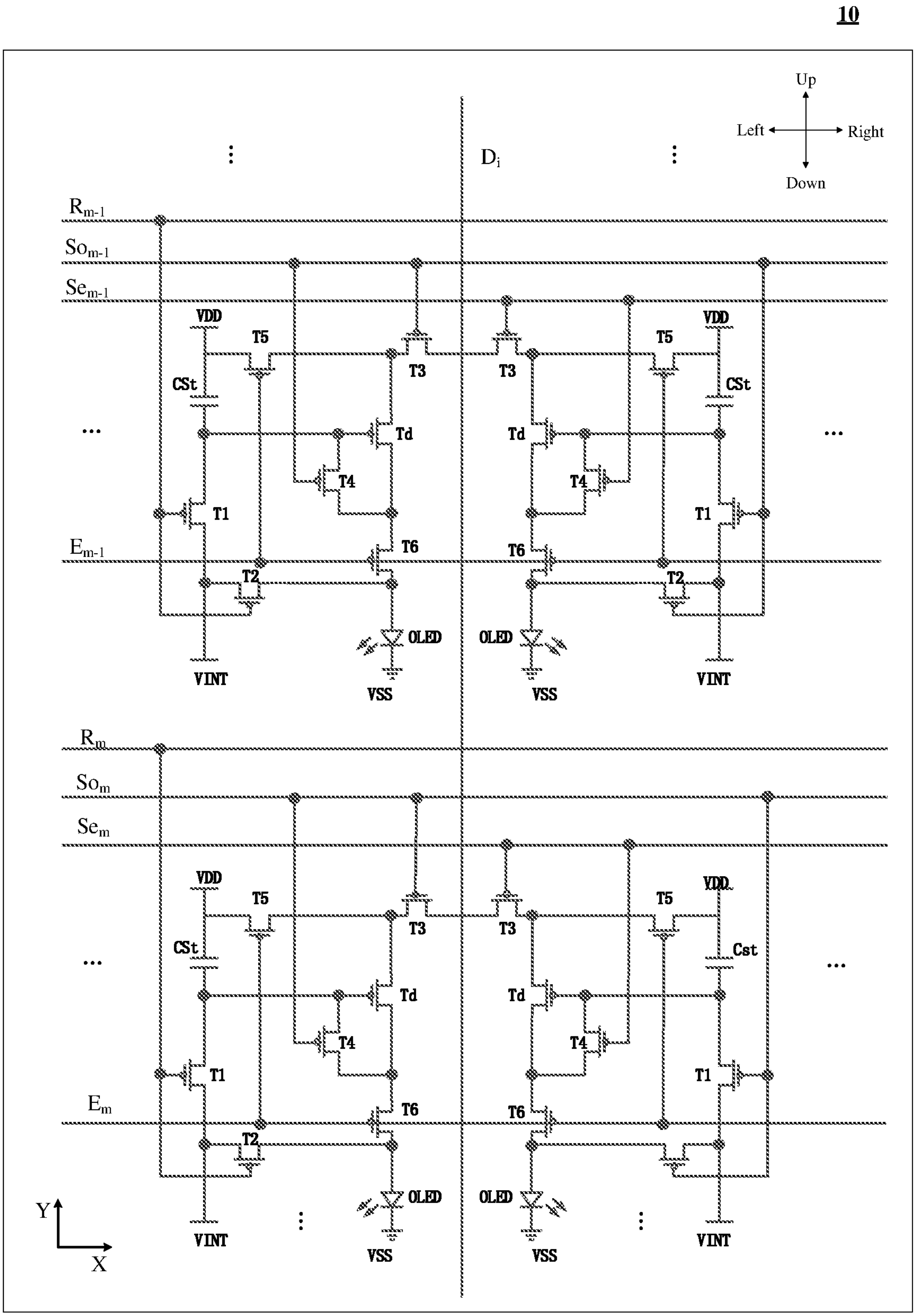
FIG. 9B is another schematically structural diagram of the array substrate provided by the embodiments of the present disclosure in which the array substrate includes the pixel circuit of FIG. 6.

FIG. 9B is another schematically structural diagram of the array substrate provided by the embodiments of the present disclosure in which the array substrate includes the pixel circuit of FIG. 6.

As shown in FIG. 9B, in each of pixel units of nth and (n+1)th columns among an (m−1)th row of pixel units, a first electrode of a data writing transistor T3 is connected to an ith data line $D_i$ to receive a data signal. In each of pixel units of the nth and (n+1)th columns among an mth row of pixel units, a first electrode of a data writing transistor T3 is connected to the ith data line Di to receive a data signal. Comparing FIGS. 9A and 9B, it can be seen that the pixel units of the nth and (n+1)th columns in the array substrate 10 shown in FIG. 9A are connected to different data lines D. The pixel units of the nth column are connected to the nth data line $D_n$, while the pixel units of the (n+1)th column are connected to the (n+1)th data line $D_{n+1}$. However, in the array substrate 10 shown in FIG. 9B, the pixel units of the nth and (n+1)th columns are connected to the same data line D. The pixel units of the nth column and the pixel units of the (n+1)th column are both connected to the ith data line $D_i$.

For the sake of brevity, only the connection mode between the data writing transistor T3 and the data line in the array substrate of FIG. 9B is described in detail here. Regarding the connection mode of other transistors in the array substrate of FIG. 9B, reference may be made to the above related description for the array substrate in FIG. 9A, which are not be repeated here.

Figure 10:
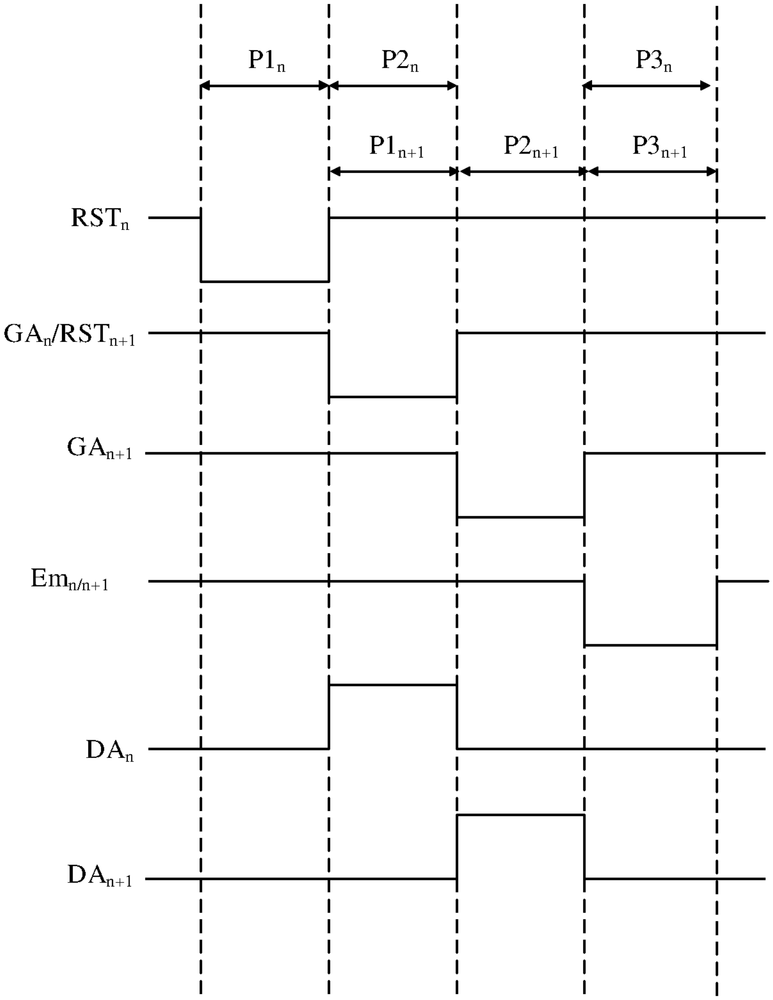
FIG. 10 is a timing diagram of signals for driving the array substrate provided by the embodiments of the present disclosure.

FIG. 10 is a timing diagram of signals for driving the array substrate provided by the embodiments of the present disclosure.

A working process of a pixel unit of an mth row in an array substrate provided by embodiments of the present disclosure will be described as below in conjunction with FIG. 10.

As shown in FIG. 10, the working process of a pixel unit of an nth column in the pixel units the mth row includes three stages, namely, a first reset stage P$\mathbf{1}_n$, a first data writing and compensation stage P$\mathbf{2}_n$, and a first light-emitting stage P$\mathbf{3}_n$. The working process of a pixel unit of an (n+1)th column in the mth row of pixel units also includes three stages, namely, a second reset stage P$\mathbf{1}_{n+1}$, a second data writing and compensation stage P$\mathbf{2}_{n+1}$ and a third light-emitting stage P$\mathbf{3}_{n+1}$.

As shown in FIG. 10, in the first reset stage P$\mathbf{1}_n$, a low-level reset signal $RST_n$ is provided for the pixel unit of the nth column in the mth row of pixel units to reset the pixel unit of the nth column in the mth row of pixel units.

For example, while the array substrate adopts the structure of the array substrate 10 in FIG. 2A, the reset signal $RST_n$ refers to the first scan signal which is provided by the first gate line $So_{m-1}$ in the (m−1)th pair of gate lines $S_{m-1}$ and serves as the second reset signal. While the array substrate adopts the structure of the array substrate 10 in FIG. 2B, the reset signal $RST_n$ refers to the second scan signal which is provided by the second gate line $Se_{-1}$ in the (m−1) pair of gate lines $S_{m-1}$ and serves as the second reset signal. When the array substrate adopts the structure of the array substrate 10 in FIG. 3A or FIG. 3B, the reset signal $RST_n$ refers to the second reset signal provided by the mth reset signal line $R_m$.

As shown in FIG. 10, in the first data writing and compensation stage P$\mathbf{2}_n$, a low-level scan signal $GA_n$ and a high-level data signal $DA_n$ are provided for the pixel unit of the nth column in the mth row of pixel units, so as to perform data writing and compensation on the pixel unit of the nth column in the mth row of pixel units.

For example, the scan signal $GA_n$ refers to a first scan signal provided by a first gate line $So_m$ in an mth pair of gate lines $S_m$.

For example, the data signal $DA_n$ refers to a data signal provided by a data line corresponding to pixel units of the nth column. For example, in a situation where a plurality of data lines are in one-to-one correspondence to a plurality of columns of pixel units, the data signal $DA_n$ refers to a data signal provided by an nth data signal line $D_n$ As shown in FIG. 10, in the first light-emitting stage P$\mathbf{3}_n$, a low-level light-emitting control signal $EM_n$ is provided for the pixel unit of the nth column in the mth row of pixel units, so that the pixel unit of the nth column in the mth row of pixel units displays.

For example, the light-emitting control signal $EM_n$ refers to a light-emitting control signal provided by an mth light-emitting control signal line $E_m$.

As shown in FIG. 10, in the second reset stage P$\mathbf{1}_{n+1}$, a low-level reset signal $RST_{n+1}$ is provided for a pixel unit of an (n+1)th column in the mth row of pixel units, so as to reset the pixel unit of the (n+1)th column in the mth row of pixel units.

For example, the reset signal $RST_{n+1}$ refers to a first scan signal provided by a first gate line $So_m$ in an mth pair of gate lines $S_m$, that is, the scan signal $GA_n$.

As shown in FIG. 10, in the second data writing and compensation stage P$\mathbf{2}_{n+1}$, a low-level scan signal $GA_{+1}$ and a high-level data signal $DA_{n+1}$ are provided for the pixel unit of the (n+1)th column in the mth row of pixel units, so as to perform data writing and compensation on the pixel unit of the (n+1)th column in the mth row of pixel units.

For example, the scan signal $GA_{n+1}$ refers to a first scan signal provided by a second gate line $Se_m$ of an mth pair of gate lines $S_m$.

For example, the data signal $DA_{n+1}$ refers to a data signal provided by a data line corresponding to pixel units of the (n+1)th column. For example, in a situation where a plurality of data lines are in one-to-one correspondence with a plurality of columns of pixel units, the data signal $DA_{n+1}$ refers to a data signal provided by an (n+1)th data signal line $D_{n+}1$.

As shown in FIG. 10, in the second light-emitting stage P$\mathbf{3}_{n+1}$, a low-level light-emitting control signal $EM_{n+1}$ is provided for the pixel unit of the (n+1)th column in the mth row of pixel units, so that the pixel unit of the (n+1)th column in the mth row of pixel units displays.

For example, the light-emitting control signal $EM_{n+1}$ refers to a light-emitting control signal provided by an mth light-emitting control signal line $E_m$.

With reference to FIG. 10, among the mth row of pixel units, the scan signal $GA_n$ of the pixel unit of the nth column may serve as the reset signal $RST_{n+1}$ of the pixel unit of the (n+1)th column. In this case, at the same time of writing and compensating for the pixel unit in the nth column, the pixel unit in the (n+1)th column can be reset; that is, the first data writing and compensation stage P$\mathbf{2}_n$ and the second reset stage P$\mathbf{1}_{n+1}$ may be synchronized in time sequence.

With reference to FIG. 10, among the mth row of pixel units, the light-emitting control signal $EM_n$ of the pixel unit of the nth column and the light-emitting control signal $EM_{n+1}$ of the pixel unit of the (n+1)th column are the same light-emitting control signal, that is, the first light-emitting stage P$\mathbf{3}_n$ and the second light-emitting stage P$\mathbf{3}_{n\ 1}$ may be synchronized in time sequence.

Moreover, with reference to FIG. 10, among the mth row of pixel units, the pixel unit of the nth column is first reset; then, at the same time of writing and compensating for the pixel unit of the nth column, the pixel unit of the (n+1)th column is reset; next, data writing and compensation is performed on the pixel unit of the (n+1)th column; finally, the pixel unit of the nth column and the pixel unit of the (n+1)th column display at the same time. In this case, the time sequence of the first reset stage P$\mathbf{1}_n$, the first data writing and compensation stage P$\mathbf{2}_n$, the first light-emitting stage P$\mathbf{3}_n$, the second reset stage P$\mathbf{1}_{n+1}$, the second data writing and compensation stage P$\mathbf{2}_{n+1}$ and the third light-emitting stage P$\mathbf{3}_{n+1}$ is: P$\mathbf{1}_n$→P$\mathbf{2}_n$ & P$\mathbf{1}_{n+1}$→P$\mathbf{2}_{n+1}$→P$\mathbf{3}_n$ & P$\mathbf{3}_{n+1}$. It can be seen that in the mth row of pixel units, the charging process for the pixel unit of the nth column and the charging process for the pixel unit of the (n+1)th column (the first data writing and compensation stage P2. and the second data writing and compensation stage $P2_{n+1}$) are performed separately and have same charging time. Moreover, the light-emitting process for the pixel unit of the nth column and the light-emitting process for the pixel unit of the (n+1)th column (the first light-emitting stage $P3_n$ and the third light-emitting stage $P3_{n+1}$) are synchronized and have same light-emitting duration, which can make the pixel units of the nth and (n+1)th columns in the mth rows of pixel units have uniform light-emitting brightness, which increases the display quality.

It should be noted that, although it is shown in FIG. 10 that the pixel unit of the nth column and the pixel unit of the (n+1)th column in the mth row of pixel units receive different data signals (the pixel unit of the nth column receives the data signal $D_n$, and the pixel unit of (n+1)th column receives the data signal $D_{n30\ 1}$), the pixel unit of the nth column and the pixel unit of the (n+1)th column may be connected to the same data line to receive the same data signal, this is because the charging process for the pixel unit of the nth column in the mth row of pixel units and the charging process for the pixel unit of the (n+1)th column in the mth row of pixel units (the first data writing and compensation stage $P2_n$ and the second data writing and compensation stage $P2_{n+1}$) are performed separately. This same data signal is at a high level in both the data writing and compensation stage $P2_n$ and the second data writing and compensation stage $P2_{n+1}$. In the first data writing and compensation stage $P2_n$, the pixel unit of the nth column of $P2_n$ is switched on and the pixel unit of the (n+1)th column is switched off (the scan signal $GA_n$ is at a low level and the scan signal $GA_{n+1}$ is at a high level), and in the second data writing and compensation stage $P2_{n+1}$, the pixel unit in the nth column is switched off and the pixel unit in the (n+1)th column is switched on (the scan signal $GA_n$ is at a high level, and the scan signal $GA_{n+1}$ is at a low level), so it is possible to provide a high-level data signal for the pixel unit of the nth column in the first data writing and compensation stage $P2_n$ and to provide a high-level data signal for the pixel unit of the (n+1)th column in the second data writing and compensation stage $P2_{n+1}$ through the same data line. It should be noted that, although only the working process of pixel units of the mth row in the array substrate provided by the embodiment of the present disclosure is described with reference to FIG. 10, the working process of the pixel units of other rows in the array substrate provided by the embodiment of the present disclosure (for example, the working process of the pixel unit of the (m−1)th row) is similar to the working process of the pixel unit of the mth row. Thus, reference may be made to the above description of the working process of the pixel unit in the mth row in conjunction with FIG. 10, which are not repeated here.

At least one embodiment of the present disclosure further provides a display panel including the array substrate provided by any one of embodiments of the present disclosure.

Figure 11:
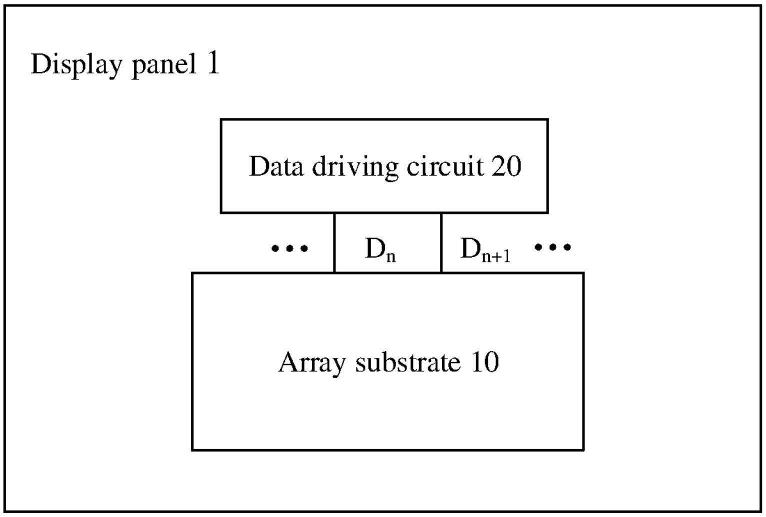
FIG. 11 is a schematically structural diagram of a display panel provided by the embodiments of the present disclosure.

FIG. 11 is a schematic structural diagram of a display panel provided by the embodiments of the present disclosure. As shown in FIG. 11, the display panel 1 includes a data driving circuit 20 and an array substrate 10 provided by any one of the embodiments of the present disclosure.

As shown in FIG. 11, the data driving circuit 20 is connected to a plurality of data lines D and is configured to generate data signals. For example, the data driving circuit 20 provides a data signal for pixel units of an nth column in the array substrate 10 through an nth data line $D_n$.

For example, the display panel 1 may further include other components, such as a timing controller, a signal decoding circuit, a voltage conversion circuit, etc. These components may, for example, adopt existing conventional components, which are not described in detail here.

For example, the display panel 1 may be a rectangular panel, a circular panel, an oval panel, a polygonal panel, or the like. Moreover, the display panel 1 may be not only a flat panel, but also a bending panel, or even a spherical panel. For example, the display panel 1 may further have a touch function, that is, the display panel 1 is a touch display panel.

For example, the display panel 1 may be applied to any product or component with a display function, such as a mobile phone, a tablet computer, a television, a display, a laptop computer, a digital photo frame, or a navigator.

The display panel provided by the embodiment of the present disclosure has the same or similar beneficial effects as the array substrate provided by the foregoing embodiments of the present disclosure. Because the array substrate has been described in detail in the foregoing embodiments, it will not be repeated here.

At least one embodiment of the present disclosure further provides a driving method applied to an array substrate provided by any one of the embodiments of the present disclosure.

Figure 12:
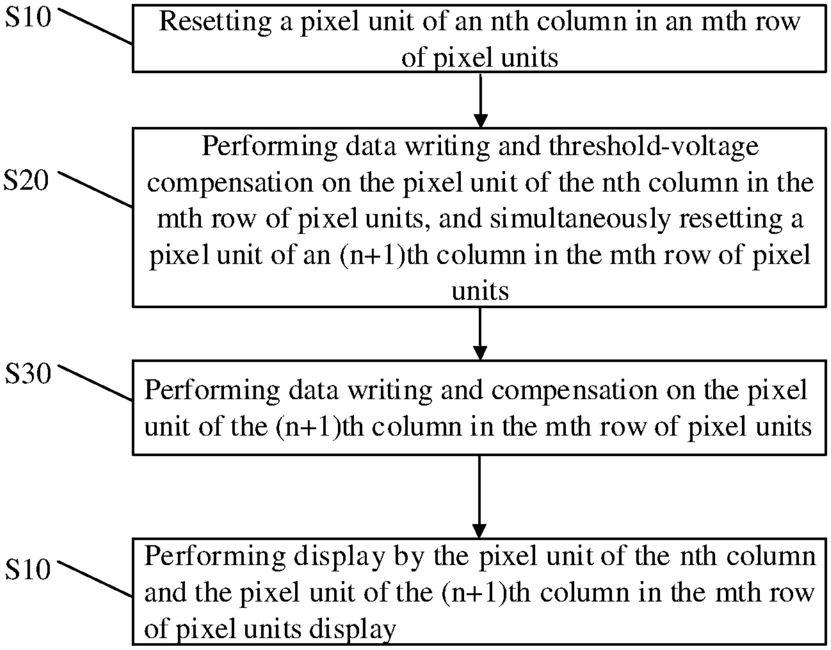
FIG. 12 is a flow chart of a driving method of the array substrate provided by the embodiments of the present disclosure.

FIG. 12 is a flow chart of a driving method of the array substrate provided by the embodiments of the present disclosure. As shown in FIG. 12, the driving method includes:

Step S10: resetting a pixel unit of an nth column in an mth row of pixel units;

Step S20: performing data writing and compensation on the pixel unit of the nth column in the mth row of pixel units, and simultaneously resetting a pixel unit of an (n+1)th column in the mth row of pixel units;

Step S30: performing data writing and compensation on the pixel unit of the (n+1)th column in the mth row of pixel units; and Step S40: performing display by the pixel unit of the nth column and the pixel unit of the (n+1)th column in the mth row of pixel units.

For example, a scan signal terminal of the pixel unit of the nth column in the mth row of pixel units is connected to a first gate line of an mth pair of gate lines, a data signal terminal of the pixel unit of the nth column in the mth row of pixel units is connected to one data line corresponding to pixel units of the nth column, and a reset signal terminal of the pixel unit of the (n+1)th column in the mth row of pixel units is connected to a first gate line of an mth pair of gate lines; in this case, the step S20 includes: providing a first scan signal for the pixel unit of the nth column in the mth row of pixel units through the first gate line in the mth pair of gate lines and providing a data signal for the pixel unit of the nth column in the mth row of pixel units through one data line corresponding to the pixel units of the nth column, so as to perform data writing and compensation on the pixel unit of the nth column in the mth row of pixel units; and simultaneously providing a first scan signal for the pixel unit of the (n+1)th column in the mth row of pixel units through the first gate line in the mth pair of gate lines, the first scan signal being used as the first reset signal to reset the pixel unit of the (n+1)th column in the mth row of pixel units.

For example, a reset signal terminal of the pixel unit of the nth column in the mth row of pixel units is connected to the first gate line in the (m−1)th pair of gate lines; in this case, the step S10 include: providing a first scan signal for the pixel unit of the nth column in the mth row of pixel units through the first gate line in the (m−1)th pair of gate lines, the first scan signal being used as a second reset signal to reset the pixel unit of the nth column in the mth row of pixel units.

For example, the reset signal terminal of the pixel unit of the nth column in the mth row of pixel units is connected to a second gate line of the (m−1)th pair of gate lines; in this case, the step S10 includes: providing a second scan signal for the pixel unit of the nth column in the mth row of pixel units through the second gate line in the (m−1)th pair of gate lines, the second scan signal being used as a second reset signal to reset the pixel unit of the nth column in the mth row of pixel units.

For example, in a situation where the array substrate includes a plurality of reset signal lines, the reset signal terminal of the pixel unit of the nth column in the mth row of pixel units is connected to an mth reset signal line; in this case, the step S10 includes: providing a second reset signal for the pixel unit of the nth column in the mth row of pixel units to reset the pixel unit of the nth column in the mth row of pixel units.

For example, a scan signal terminal of the pixel unit of the (n+1)th column in the mth row of pixel units is connected to the second gate line of the mth pair of gate lines, and a data signal terminal of the pixel unit of the (n+1)th column in the mth row of pixel units is connected to one data line corresponding to pixel units of the (n+1)th column; in this case, the step S30 includes: providing a second scan signal for the pixel unit of the (n+1)th column in the mth row of pixel units through the second gate line in the mth pair of gate lines and providing a data signal for the pixel unit of the (n+1)th column in the mth row of pixel units through one data line corresponding to the pixel units of the (n+1)th column, so as to perform data writing and compensation on the pixel unit of the (n+1)th column in the mth row of pixel units.

For example, in a situation where the array substrate includes a plurality of light-emitting control signal lines, a light-emission control signal terminal of the pixel unit of the nth column in the mth row of pixel units and a light-emission control signal terminal of the pixel unit of the (n+1)th column in the mth row of pixel units are both connected to an mth light-emitting control signal; in this case, the step S40 includes: providing light-emitting control signals for the pixel units of the nth and (n+1)th columns in the mth row of pixel units through the mth light-emitting control signal line, so as to perform display by the pixel units of the nth and (n+1)th columns in the mth row of pixel units display.

The driving method of the array substrate provided by the embodiment of the present disclosure can first charge the pixel unit of the nth column in the mth row of pixel units, and then charge the pixel unit of the (n+1)th column in the mth row of pixel units, finally, the pixel unit of the nth column and the pixel unit of the (n+1)th column in the mth row of pixel units display. In this way, the manner in which the pixel unit of the nth column in the mth row of pixel units is charged is same as the manner in which the pixel unit of the (n+1)th column in the mth row of pixel units is charged, moreover, the display brightness of the pixel units of the nth column and the pixel unit of the (n+1)th column in the mth row of pixel units are uniform.

For the present disclosure, the following points need to be explained:

(1) The drawings of the embodiments of the present disclosure only relate to the structures related to the embodiments of the present disclosure, and other structures may refer to the general design.

(2) Without conflict, the embodiments of the present disclosure and features in the embodiments of the present disclosure can be combined with each other to obtain other embodiments.

The foregoing embodiments merely are exemplary embodiments of the disclosure, and not intended to define the scope of the disclosure, and the scope of the disclosure is determined by the appended claims.

The invention claimed is:

1. An array substrate, comprising:

a plurality of pairs of gate lines, each pair of gate lines comprising a first gate line and a second gate line;

a plurality of data lines; and a pixel array, comprising a plurality of pixel units arranged into a plurality of rows and a plurality of columns;

wherein each of the plurality of pixel units comprises a scan signal terminal, a data signal terminal and a reset signal terminal, the plurality of rows of pixel units are in one- to-one correspondence with the plurality of pairs of gate lines, and the pixel units of each column corresponds to one data line of the plurality of data lines;

the scan signal terminal of a pixel unit of an nth column in an mth row of pixel units is connected to the first gate line in an mth pair of gate lines to receive a first scan signal; m and n are positive integers;

the scan signal terminal of a pixel unit of an (n+1) th column in the mth row of pixel units is connected to the second gate line in the mth pair of gate lines to receive a second scan signal;

the reset signal terminal of the pixel unit of the (n+1) th column in the mth row of pixel units is connected to the first gate line in the mth pair of gate lines to receive the first scan signal serving as a first reset signal;

data signal terminals of the pixel units of each column are connected to a corresponding data line to receive a data signal;

wherein the reset signal terminal of the pixel unit of the nth column in the mth row of pixel units is connected to the first gate line of an (m-1) th pair of gate lines to receive the first scan signal, and the first scan signal is provided by the first gate line of the (m- 1) th pair of gate lines and used as a second reset signal, m is an integer greater than 1;

a scan signal terminal of a pixel unit of an nth column in an (m-1) th row of pixel units is connected to the first gate line of the (m-1) th pair of gate lines.

2. The array substrate according to claim 1, further comprising a plurality of reset signal lines, wherein the plurality of reset signal lines are in one-to-one correspondence with the plurality of rows of pixel units;

the reset signal terminal of the pixel unit of the nth column in the mth row of pixel units is connected to an mth reset signal line to receive a second reset signal.

3. The array substrate according to claim 2, further comprising a first scan driving circuit, wherein the first scan driving circuit is connected to the plurality of reset signal lines, and is configured to generate the second reset signal.

4. The array substrate according to claim 1, further comprising a plurality of light-emitting control signal lines, wherein the plurality of light-emitting control signal lines are in one-to-one correspondence with the plurality of rows of pixel units;

each of the plurality of pixel units further comprises a light-emission control signal terminal, and light-emission control signal terminals of pixel units in the mth row of pixel units are connected to an mth light-emission control signal line to receive a light- emission control signal.

5. The array substrate according to claim 4, further comprising a second scan driving circuit, wherein the second scan driving circuit is connected to the plurality of light-emitting control signal lines and is configured to generate the light-emitting control signal.

6. The array substrate according to claim 1, wherein every two adjacent columns of pixel units correspond to a same data line, data signal terminals of pixel units of the nth column and data signal terminals of pixel units of the (n+1) th column are connected to a same data line.

7. The array substrate according to claim 1, further comprising a third scan driving circuit, the third scan driving circuit is connected to the plurality of pairs of gate lines, and is configured to generate the first scan signal and the second scan signal.

8. The array substrate according to claim 7, wherein the third scan driving circuit comprises a first scan driving sub-circuit and a second scan driving sub-circuit;

the first scan driving sub-circuit is connected to the first gate line in each pair of gate lines and is configured to generate the first scan signal;

the second scan driving sub-circuit is connected to the second gate line of each pair of gate lines and is configured to generate the second scan signal.

9. The array substrate according to claim 8, wherein the first scan driving sub-circuit and the second scan driving sub-circuit are respectively disposed on two opposite sides of the pixel array.

10. The array substrate according to claim 1, wherein each of the plurality of pixel units comprises a pixel circuit, and the pixel circuit comprises: a reset circuit, a data writing and compensation circuit, a driving circuit, and a light-emitting control circuit;

the reset circuit comprises the reset signal terminal and is connected to a reset voltage source, the driving circuit, and a light emitting element, and the reset circuit is configured to apply a reset voltage to the driving circuit and the light emitting element to reset the driving circuit and the light emitting element;

the data writing and compensation circuit comprises the scan signal terminal and the data signal terminal and is connected to the driving circuit, and the data writing and compensation circuit is configured to write the data signal into the driving circuit and compensate for the driving circuit;

the driving circuit is configured to generate a driving current for driving the light emitting element to emit light;

each of the plurality of pixel units further comprises a light-emission control signal terminal, the light-emitting control circuit comprises the light-emitting control signal terminal and is connected to a first voltage source, the driving circuit, and the light emitting element, and the light-emitting control circuit is configured to apply a first voltage to the driving circuit and apply the driving current generated by the driving circuit to the light emitting element.

11. The array substrate according to claim 10, wherein the reset circuit comprises a first reset transistor and a second reset transistor;

the data writing and compensation circuit comprises a data writing transistor, a compensation transistor, and a storage capacitor;

the driving circuit comprises a driving transistor;

the light-emitting control circuit comprises a first light-emitting control transistor and a second light-emitting control transistor;

a gate electrode of the first reset transistor is connected to the reset signal terminal, a first electrode of the first reset transistor is connected to the reset voltage source, and a second electrode of the first reset transistor is connected to a gate electrode of the driving transistor;

a gate electrode of the second reset transistor is connected to the reset signal terminal, a first electrode of the second reset transistor is connected to the reset voltage source, and a second electrode of the second reset transistor is connected to a first terminal of the light emitting element;

a gate electrode of the data writing transistor is connected to the scan signal terminal, a first electrode of the data writing transistor is connected to the data signal terminal, and a second electrode of the data writing transistor is connected to a first electrode of the driving transistor;

a gate electrode of the compensation transistor is connected to the scan signal terminal, a first electrode of the compensation transistor is connected to a second electrode of the driving transistor, and a second electrode of the compensation transistor is connected to the gate electrode of the driving transistor;

a first terminal of the storage capacitor is connected to the first voltage source, and a second terminal of the storage capacitor is connected to the gate electrode of the driving transistor;

a gate electrode of the first light-emitting control transistor is connected to the light- emitting control signal terminal, a first electrode of the first light-emitting control transistor is connected to the first voltage source, and a second electrode of the first light-emitting control transistor is connected to the first electrode of the driving transistor;

a gate electrode of the second light-emitting control transistor is connected to the light-emitting control signal terminal, a first electrode of the second light-emitting control transistor is connected to the second electrode of the driving transistor, and a second electrode of the second light-emitting control transistor is connected to the first terminal of the light emitting element.

12. A display panel, comprising the array substrate according to claim 1.

13. A driving method of the array substrate according to claim 1, comprising:

resetting the pixel unit of the nth column in the mth row of pixel units;

performing data writing and compensation on the pixel unit of the nth column in the mth row of pixel units, and simultaneously resetting the pixel unit of the (n+1) th column in the mth row of pixel units;

performing data writing and compensation on the pixel unit of the (n+1) th column in the mth row of pixel units;

performing display by the pixel unit of the nth column and the pixel unit of the (n+1) th column in the mth row of pixel units.

14. The driving method according to claim 13, wherein the performing data writing and compensation on the pixel unit of the nth column in the mth row of pixel units and simultaneously resetting the pixel unit of the (n+1) th column in the mth row of pixel units comprising:

providing the first scan signal for the pixel unit of the nth column in the mth row of pixel units through the first gate line in the mth pair of gate lines, and providing the data signal for the pixel unit of the nth column in the mth row of pixel units through one data line corresponding to the pixel units of the nth column, so as to perform data writing and compensation on the pixel unit of the nth column in the mth row of pixel units; and simultaneously providing the first scan signal for the pixel unit of the (n+1) th column in the mth row of pixel units through the first gate line in the mth pair of gate lines, the first scan signal being used as the first reset signal to reset the pixel unit of the (n+1) th column in the mth row of pixel units.

15. The driving method of claim 14, wherein the resetting the pixel unit of the nth column in the mth row of pixel units comprises:

providing the first scan signal for the pixel unit of the nth column in the mth row of pixel units through the first gate line in the (m−1) th pair of gate lines, the first scan signal being used as a second reset signal to reset the pixel unit of the nth column in the mth row of pixel units; or providing the second scan signal for the pixel unit of the nth column in the mth row of pixel units through the second gate line in the (m−1) th pair of gate lines, the second scan signal being used as the second reset signal to reset the pixel unit of the nth column in the mth row of pixel units.

16. The driving method of claim 15, wherein the array substrate further comprises a plurality of light-emitting reset signal lines, the resetting the pixel unit of the nth column in the mth row of pixel units comprises:

providing a second reset signal for the pixel unit of the nth column in the mth row of pixel units to reset the pixel unit of the nth column in the mth row of pixel units.

17. The driving method according to claim 13, wherein the performing data writing and compensation on the pixel unit of the (n+1) th column in the mth row of pixel units comprises:

providing the second scan signal for the pixel unit of the (n+1) th column in the mth row of pixel units through the second gate line in the mth pair of gate lines, and providing the data signal for the pixel unit of the (n+1) th column in the mth row of pixel units through one data line corresponding to the pixel units of the (n+1) th column, so as to perform data writing and compensation on the pixel unit of the (n+1) th column in the mth row of pixel units.

18. The driving method according to claim 13, wherein the array substrate further comprises a plurality of light-emitting control signal lines;

the performing display by the pixel unit of the nth column and the pixel unit of the (n+1) th column in the mth row of pixel units display comprises:

providing a light-emitting control signal for the pixel units of the nth column and the (n+1) th column in the mth row of pixel units through an mth light-emitting control signal line, so as to perform display by the pixel units of the nth and (n+1) th columns in the mth row of pixel units.

19. The array substrate according to claim 1, wherein the reset signal terminal of the pixel unit of the nth column in the mth row of pixel units is connected to the second gate line of the (m−1) th pair of gate lines to receive the second scan signal, and the second scan signal is provided by the second gate line of the (m−1) th pair of gate lines and used as the second reset signal, m is an integer greater than 1.

* * * * *